(12) United States Patent
Lee et al.

(10) Patent No.: US 8,369,438 B2
(45) Date of Patent: Feb. 5, 2013

(54) ITERATIVE TREE SEARCH-BASED PRECODING TECHNIQUE FOR MULTIUSER MIMO COMMUNICATION SYSTEM

(75) Inventors: Joo-Hyun Lee, Suwon-si (KR); Sung-Soo Hwang, Yongin-si (KR); Sang-Boh Yun, Seongnam-si (KR); Jong-Ho Lee, Seoul (KR); Sung-Yoon Jung, Seoul (KR); Joonhyuk Kang, Seoul (KR); Kyung-Ho Park, Seoul (KR); Jong-Sub Cha, Seoul (KR); Namseok Chang, Suwon-si (KR); Keon-Kook Lee, Daejeon (KR)

(73) Assignees: Samsung Electronics Co., Ltd, Suwon-si (KR); Korea Advanced Institute of Science and Technology, Daejeon (KR)

( * ) Notice: Subject to any disclaimer, the term of this patent is extended or adjusted under 35 U.S.C. 154(b) by 937 days.

(21) Appl. No.: 12/454,272

(22) Filed: May 14, 2009

(65) Prior Publication Data
US 2009/0286494 A1 Nov. 19, 2009

(30) Foreign Application Priority Data
May 14, 2008 (KR) .................. 10-2008-0044665

(51) Int. Cl.
*H04B 7/02* (2006.01)
(52) U.S. Cl. ..................................... 375/267
(58) Field of Classification Search ........... 375/260, 375/265, 267, 285, 295, 296, 299; 455/114.2, 455/114.3
See application file for complete search history.

(56) References Cited

U.S. PATENT DOCUMENTS

| | | | | |
|---|---|---|---|---|
| 5,388,124 | A * | 2/1995 | Laroia et al. | 375/286 |
| 7,580,445 | B2 * | 8/2009 | Wang et al. | 375/146 |
| 8,130,862 | B2 * | 3/2012 | Forenza et al. | 375/295 |
| 2008/0247489 | A1 * | 10/2008 | Kou et al. | 375/299 |
| 2009/0122854 | A1 * | 5/2009 | Zhu et al. | 375/232 |

OTHER PUBLICATIONS

B.M. Hochwald, et al.: "A Vector-Perturbation Technique for Near—Capacity Multiantenna Multiuser Communication—Part II: Perturbation", IEEE Transactions on Communications, vol. 53, No. 3, pp. 537-544, Mar. 2005.
C.B. Peel, et al.: "A Vector-Perturbation Technique for Near-Capacity Multiantenna Multiuser Communication—Part I: Channel Inversion and Regularization", IEEE Transactions on Communications, vol. 53, No. 1, pp. 195-202, Jan. 2005.
Eun Yong Kim, et al.: "Optimum Vector Perturbation Minimizing Total MSE in Multiuser MIMO Downlink", in proc. International Conference Communications (ICC) 2006, pp. 4242-4247, Jun. 2006.
A. Edeman: "Eigenvalues and Condition Numbers of Random Matrices", Ph.D. thesis, Massachusetts Institute of Technology, 1989, pp. 1-98.

(Continued)

*Primary Examiner* — Khanh C Tran

(57) ABSTRACT

An iterative tree search-based precoding method for a multiuser Multi-Input Multi-Output (MIMO) communication system includes determining a reference value of a cumulative branch metric of a candidate symbol, eliminating candidates having values that exceed the determined reference value of the cumulative branch metric of the candidate symbol, and registering values, which do not exceed the determined reference value of the cumulative branch metric of the candidate symbol, as entries, and selecting the least value from the values registered as the entries. Thereby, the method has low complexity and similar performance compared to an existing Sphere Encoding (SE) technique.

24 Claims, 16 Drawing Sheets

OTHER PUBLICATIONS

Korean Publication No. 10-2009-0020767, entitled "Low-Complexity Apparatus and Method for Detecting Signal Based on UITS in MIMO System", published Feb. 27, 2009 18 pages.
A. Edelman: "On the Distribution of a Scaled Condition Number", Math. Comp. 58 (1992) 185.190, Department of Mathematics, University of California, pp. 1-10.
H. Artés, et al.: "Efficient Detection Algorithms for MIMO Channels: A Geometrical Approach to Approximate ML Detection", IEEE Transactions on Signal Processing, vol. 51 pp. 2808-2820 Nov. 2003.
J. Cha, et al: "Low-Complexity Iterative QRD-M Detection Algorithm for V-BLAST Systems," Electronics Letters, vol. 43, Issue 24, Nov. 2007.

* cited by examiner

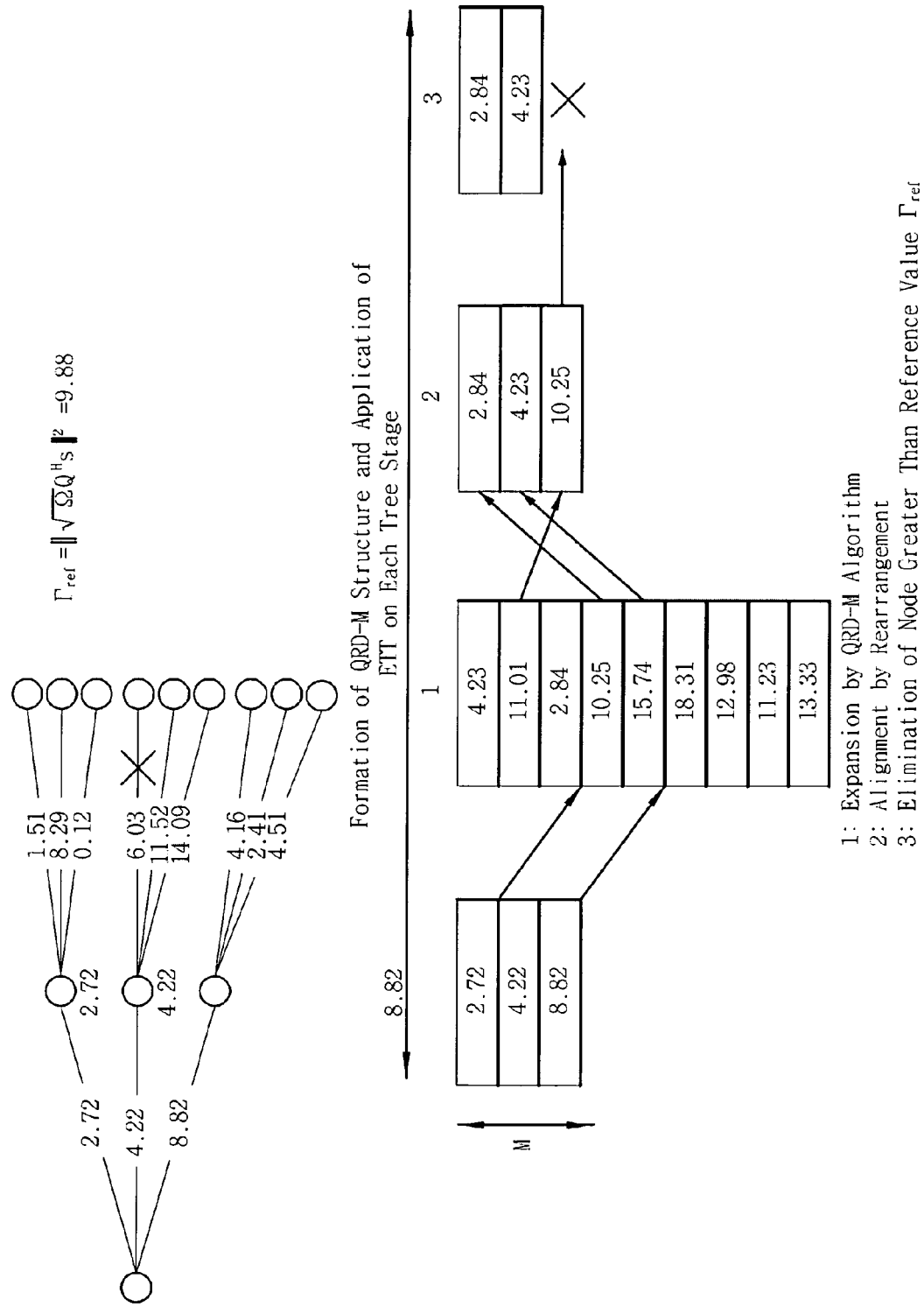

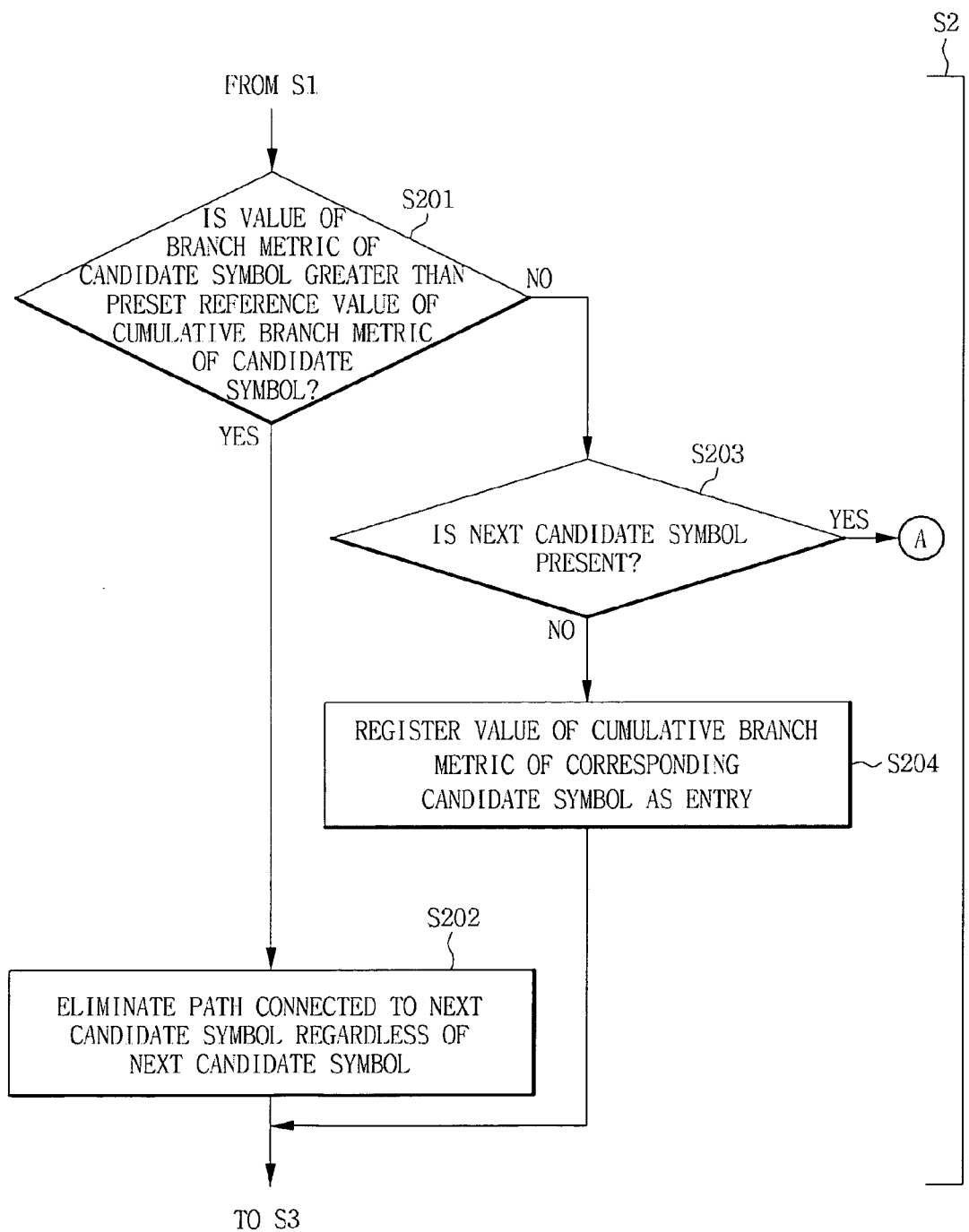

ITERATIVE TREE SEARCH-BASED PRECODING TECHNIQUE FOR MULTIUSER MIMO COMMUNICATION SYSTEM

CROSS-REFERENCE TO RELATED APPLICATION(S) AND CLAIM OF PRIORITY

The present application claims the benefit of Korean Patent Application No. 10-2008-0044665, filed May 14, 2008, the contents of which are hereby incorporated herein by reference in their entirety.

TECHNICAL FIELD OF THE INVENTION

The present invention relates to preceding techniques and, more particularly, a preceding technique based on an iterative tree search capable of efficiently eliminating interference between multiple users from a multi-user multi-input multi-output downlink channel.

BACKGROUND OF THE INVENTION

Typically, a broadcast channel refers to transmitting information from a base station having a plurality of antennas to all multiple users within one cell.

Here, each user owns a terminal having a single antenna. In this environment, the users cannot cooperate with each other, and thus it is difficult to eliminate interference between the users.

For this reason, many studies have recently been made of precoding techniques capable of eliminating interference between users in advance on the assumption that a base station can use channel information of all users.

Among these techniques, Sphere Encoding (SE) algorithm based on Vector Perturbation (VP) technique capable of driving optimal performance has been proposed.

Here, the SE algorithm exerts maximum performance, but it has high complexity and distribution, which serve as great obstacle factors on designing a system.

Generally, since the broadcast channel transmits signals to all the users who cannot cooperate with each other through a plurality of transmission antennas, there is a demand for a technique capable of efficiently eliminate the interference between the users in advance at a transmitting end.

First, a signal "y" transmitted from a base station 1 to multiple users at the same time is transmitted to receiving ends, i.e., user terminals 2, after previous elimination of the interference between the users and power normalization.

This signal can be expressed by Equation 1:

$$y = Hx + n \qquad \text{[Eqn. 1]}$$
$$= H\frac{Ps}{\sqrt{\gamma}} + n$$
$$(\gamma = \|Ps\|^2)$$

where H is the Rayleigh flat-fading channel matrix, n is the Gaussian noise vector, P is the precoding matrix for eliminating the interference between the users, s is the symbol vector of data to be transmitted, and γ is the normalized transmission power.

Among the techniques proposed to overcome this interference, the simplest technique is linear technique that includes channel inversion technique based on Zero-Forcing (ZF) technique, regularized channel inversion technique based on Minimum-Mean Square Error (MMSE) technique, and so forth.

The linear technique distorts a signal simply using an inverse matrix of the channel matrix "H" as the preceding matrix, and then transmits the distorted signal.

However, as well known through a linear detection technique of Multi-Input Multi-Output (MIMO) receiver, when an eigenvalue of the channel matrix is small, an eigenvalue of its inverse matrix increases.

This phenomenon increases the normalized transmission power "γ."

Accordingly, Signal-to-Noise Ratio (SNR) of the receiving end is lowered to degrade performance.

In order to prevent this power loss, Tomlinson-Harashima Precoding (THP) is proposed which restores to original information by expanding an existing constellation to infinity to select a point corresponding to low power loss and by using a modulo technique at the receiving end, i.e., the user terminal.

This THP technique considerably improves performance compared to the existing linear technique, but it still does not obtain the optimal performance.

Afterwards, Vector Perturbation (VP) is proposed which derives optimal performance by adding a distortion value that expands the constellation to infinity on the basis of the THP technique and minimizes the transmission power.

This technique can be divided into a ZF-VP based on the ZF, and MMSE-VP based on the MMSE rather than minimum transmission power, wherein it is known that the latter shows better performance than the former.

Further, Lattice Reduction (LR) technique is introduced that can improve performance through channel orthogonalization on the assumption that a channel environment gradually varies.

Among these techniques, the linear techniques have low complexity and difficulty in obtaining the maximum performance, the non-linear techniques have maximum diversity gain of the system, and improvement in performance. In the case of the SE algorithm, the complexity is increased due to search for a maximum approximation lattice point in an infinite lattice space, and shows a characteristic that it is irregular depending on a channel environment. In other words, the SE algorithm has a characteristic that a search frequency varies depending upon a channel state, and encounters the following problems due to a long delay time when the channel state is bad.

In the event of downlink, the channel of which the transmitting end, i.e., the base station, is aware obtains information through feedback of the terminal. In this case, as the delay time increases, an error in channel information increases due to time variation of the channel.

Further, irregularity of the delay time makes it difficult to correct the error in channel information or to use, for instance, a buffer.

SUMMARY OF THE INVENTION

To address the above-discussed deficiencies of the prior art, it is a primary object to reconfigure an iterative tree search technique applied to signal detection at the receiver of an existing multi-antenna communication system so as to be suitable for a preceding technique capable of previously eliminating interference between users by applying the iterative tree search technique to a transmitting end.

Exemplary embodiments are also directed to limit a search candidate domain according to the state of a channel, calculate a reference value, and prevent expansion to a node having a value greater than this reference value in addition to the technique of the receiver, thereby improving complexity.

Exemplary embodiments are also directed to grafting a precoding technique onto the iterative tree search technique of a receiver, thereby accomplishing nearly maximum performance and low complexity that are advantageous to establishment of a real system. According to an aspect of the present invention, there is provided an iterative tree search-based preceding device for a multi-user MIMO communication system. The iterative tree search-based preceding device includes at least one receipt terminal; and a base station transmitting a pilot signal to the receipt terminal, previously eliminating interference with respect to a signal to be transmitted to the receipt terminal using information about a channel state provided from the receipt terminal, performing power normalization on the signal, and transmitting the signal, which is distorted by a distortion value to be used for modulo operation at the receipt terminal, to the receipt terminal.

According to another aspect of the present invention, there is provided an iterative tree search-based preceding method for a multi-user MIMO communication system. The iterative tree search-based preceding method includes transmitting, by a base station, a pilot signal to at least one receipt terminal, previously eliminating interference with respect to a signal to be transmitted to the receipt terminal using information about a channel state provided from the receipt terminal, and performing power normalization on the signal; and transmitting, by the base station, the signal, which is distorted by a distortion value to be used for modulo operation at the receipt terminal, to the receipt terminal.

According to exemplary embodiments, the iterative tree search-based precoding device and method for a multi-user MIMO communication system have a low complexity and an excellent performance compared to an existing SE technique.

Further, the iterative tree search-based preceding device and method limit an overall search range. Thereby, as illustrated in FIGS. 11 and 12, it can be found through average Bit Error Rate (BER) that Stack-Based Iterative Precoding (SBIP) and QRD-M-based Iterative Precoding (QRMIP) exert performance nearly similar to SE, and the loss of performance is generated only at high SNR.

Further, as illustrated in FIGS. 13 and 14, the SBIP and QRMIP techniques have nearly similar BER performance and can reduce calculation complexity compared to the SE technique.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5B illustrates application of QRMIP to an iterative tree search-based preceding device for a multi-user multi-antenna communication system according to an exemplary embodiment of the present invention;

FIGS. 8A and 8B illustrate flowcharts for a process of eliminating and registering a value of a cumulative branch metric exceeding a reference value in an iterative tree search-based preceding method for a multi-user multi-antenna communication system according to an exemplary embodiment of the present invention;

DETAILED DESCRIPTION OF THE INVENTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

An iterative tree search-based precoding device and method for a multi-user MIMO communication system according to exemplary embodiments of the invention will be described below in detail with reference to the accompanying drawings. Further, the term "user terminal" as used herein shall be construed to include a mobile station, a receipt terminal, a personal digital assistant, or the like.

Figure 1:
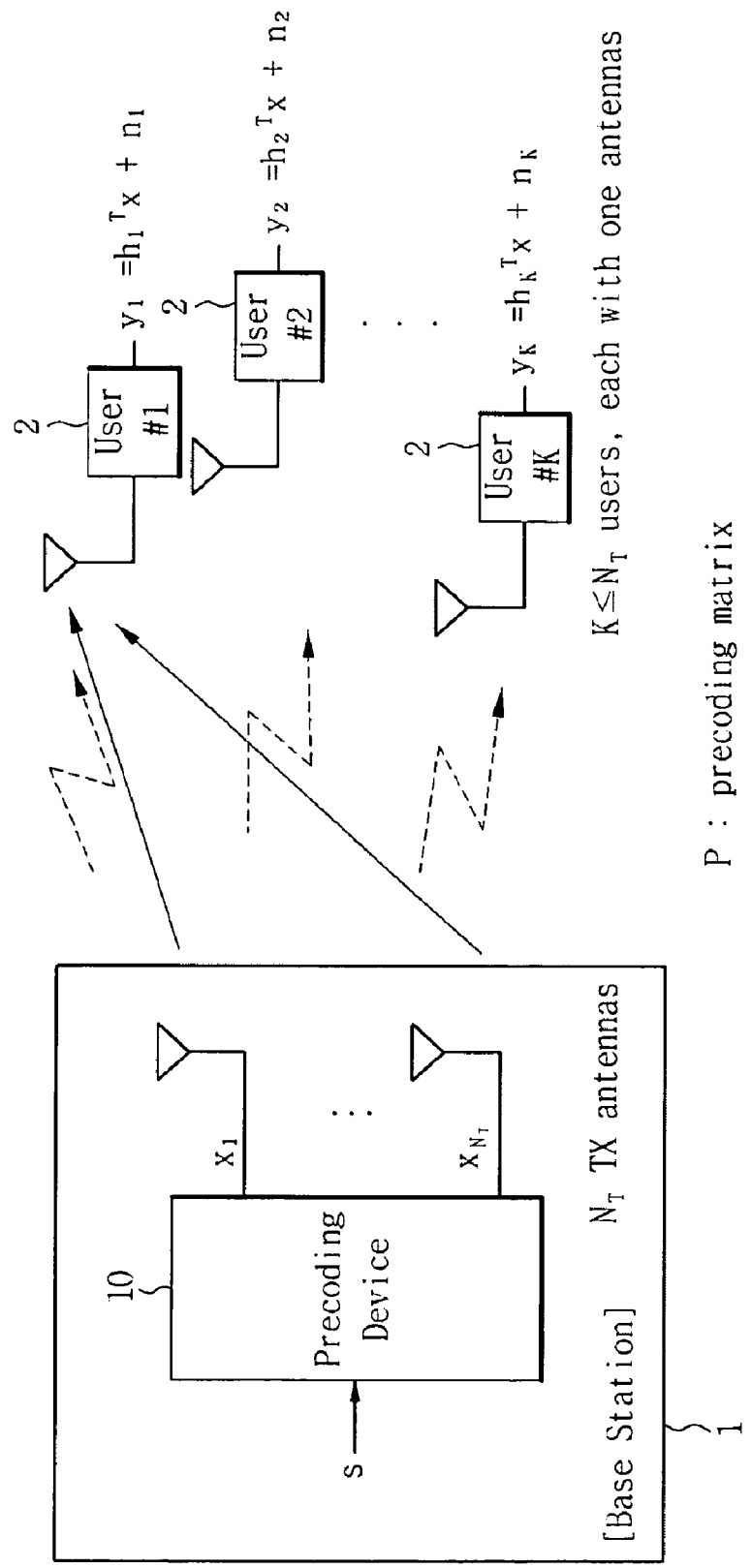
FIG. 1 illustrates a functional block diagram for the configuration of an ordinary multi-user multi-antenna communication system.

First, the present invention is based on Minimum—MMSE VP technique. FIG. 1 illustrates a system configured of a multi-user multi-antenna downlink channel. The system includes a base station 1, a precoding device 10, and at least one user terminal 2.

Therefore, upon considering the multi-user multi-antenna downlink channel, signals that are transmitted from the base station 1 to the multiple users and at the same time eliminate interference between the users in advance through the precoding device 10, are subjected to power normalization and transmitted to the user terminals 2.

This can be expressed by Equation 1 above and reproduced below.

$$y = Hx + n$$
$$= H \frac{Ps}{\sqrt{\gamma}} + n$$
$$(\gamma = \|Ps\|^2)$$
[Eqn. 1]

In Equation 1, H denotes the Rayleigh flat-fading channel matrix, n denotes the Gaussian noise vector, P denotes the precoding matrix for eliminating the interference between the users, s denotes the symbol vector of data to be transmitted, and γ denotes the normalized transmission power.

The precoding device 10 employs VP technique that adds a distortion value to a modulated symbol so as to be able to minimize the normalization factor "γ."

The VP technique has to be transformed into an integer system because it searches for an integer lattice, and thus, transforms all complex systems into integer systems.

Thus, the precoding device 10 adds the distortion value "τt'" to an original signal so as to have a minimum normalization factor "γ". This process is given by Equation 2:

$$t = \arg \min_{t' \in \mathfrak{C}^{2K}} \gamma$$
$$= \arg \min_{t' \in \mathfrak{C}^{2K}} \|Ps\|^2$$
$$= \arg \min_{t' \in \mathfrak{C}^{2K}} \|P(s + \tau t')\|^2$$
[Eqn. 2]

where γ is the normalized transmission power, P is the precoding matrix for eliminating the interference between the users, s is the symbol vector of data to be transmitted, and τt' is the distortion value.

The signal transmitted from the base station 1, the transmitting end, through this process can restore a value "s" of original data as in Equation 9 by eliminating the distortion value "τt'" through modulo operation by the same value "τ" at the user terminal 2.

$$y = \left(\frac{s}{\sqrt{\gamma}} + \frac{\tau t}{\sqrt{\gamma}} + n\right) \mod(\tau / \sqrt{\gamma})$$
$$= \frac{1}{\sqrt{\gamma}} s + n$$
[Eqn. 9]

The VP technique adds the intended distortion value by shifting a constellation so much at the transmitting end because it is assumed that the receiving end employs the modulo operation.

However, Zero-Forcing (ZF)-VP in which the precoding matrix "P" is expressed into an inverse matrix of the channel matrix "H" is subjected to reduction in Signal-to-Interference and Noise Ratio (SINR) of the receiving end that is responsible for degradation of performance.

Thus, the SINR of the receiving end is increased by applying MMSE-VP technique considering noise and interference as in Equation 3:

$$P = H^H(HH^H + \alpha I)^{-1}$$
[Eqn. 3]

where P denotes the precoding matrix for eliminating the interference between the users, and H denote the Rayleigh flat-fading channel matrix.

The precoding device 10 divides channel response into an eigenvalue and an eigenvector through Singular Value Decomposition (SVD) according to Optimum MMSE-VP technology, and can search for a vector "t" that can minimize noise and interference power and maximize the SINR of the receiving end using these eigenvalues. For example, the precoding device minimizes total MSE rather than transmission power. Finally, a cost function is given by Equation 4:

$$t = \arg \min_{t' \in \mathfrak{C}^{2K}} \|\sqrt{\Omega} Q^H (s + \tau t')\|^2$$
$$\Omega = \frac{K\sigma^2 I}{\Lambda + K\sigma^2 I}$$
[Eqn. 4]

where Λ denotes the channel matrix, H denotes the diagonal matrix with the eigenvalues, Q denotes the matrix with the eigenvectors according to the eigenvalues. These matrices can be obtained through SVD (i.e., $HH^H = Q\Lambda Q^H$).

It is important to determine the distortion value "τt'" so as to have MMSE. This determines an optimum value of the vector "t" through SE so as to detect a maximum approximation lattice point in an integer lattice space.

Figure 2:
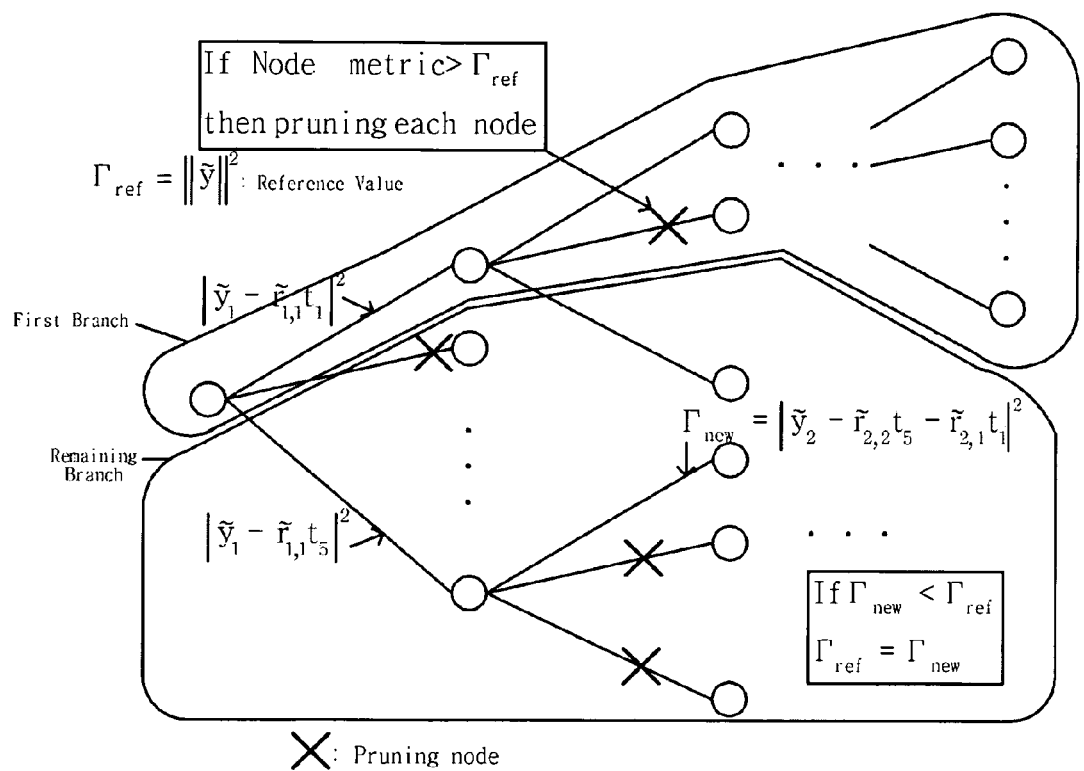
FIG. 2 illustrates an iterative tree structure in an ordinary multi-user multi-antenna communication system.

The present invention includes a tree structure as illustrated in FIG. 2.

Figure 3:
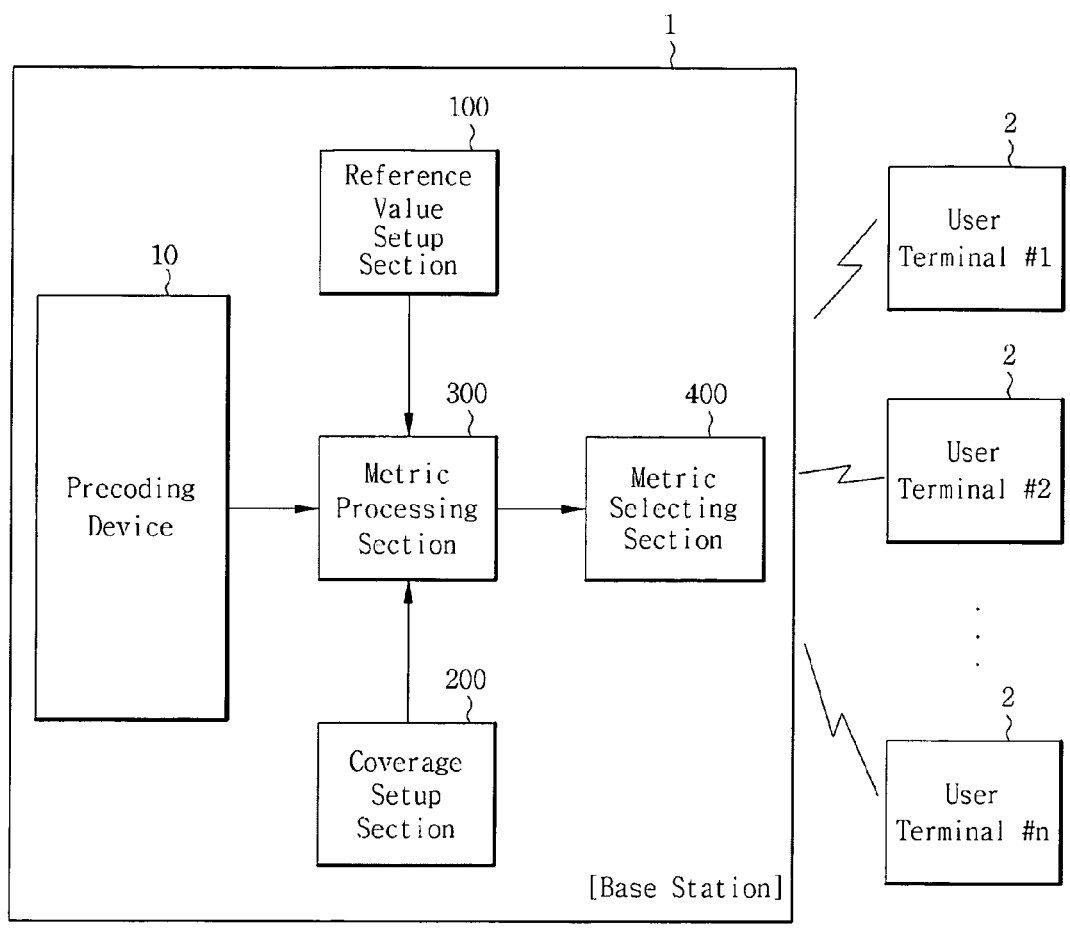
FIG. 3 illustrates an iterative tree search-based preceding device for a multi-user multi-antenna communication system according to an exemplary embodiment of the present invention.

FIG. 3 illustrates the configuration of a low-complexity precoding device based on vector perturbation in a multi-user multi-antenna communication system according to an exemplary embodiment of the invention. This precoding device includes a reference value setup section 100, a coverage setup section 200, a metric processing section 300, and a metric selecting section 400.

The reference value setup section 100 determines a reference value of a cumulative branch metric of a candidate symbol. In detail, the reference value setup section 100 determines a value, which is smaller than a square $\|\tilde{y}\|^2$ the transmitted signal using a characteristic of the VP method, as the reference value of the cumulative branch metric of the candidate symbol.

Meanwhile, the metric processing section 300 performs QR decomposition the vector "t" expressed by Equation 4 in order to form a tree structure, to limit coverage of the candidate symbol, and to represent a type used in the receiving end for smooth operation of the algorithm, and its result is given by Equation 5:

$$\hat{t} = \arg\min_{\hat{t}' \in \mathbb{C}^{2K}} \|\tilde{y} - \tilde{R}\hat{t}'\|^2 \quad [\text{Eqn. 5}]$$

$$\tilde{y} = \tilde{Q}^H \sqrt{\Omega} Q^H s, \; -\tau\sqrt{\Omega} Q^H = \tilde{Q}\tilde{R}$$

The branch metric of the candidate symbol satisfying Equation 5 can be expressed by Equation 6. In Equation 5, the QR decomposition is performed on $-\tau\sqrt{\Omega}Q^H$ in order to make the form of a triangular matrix for a smooth tree search, and thus $\tilde{Q}\tilde{R}$ is obtained. The, both sides are multiplied by $\tilde{Q}^H$ is a unitary matrix, so that the remaining portions can be expressed by $\tilde{Q}^H\sqrt{\Omega}Q^Hs-\tilde{R}\hat{t}'$, which is briefly expressed by $\hat{y}=\tilde{Q}^H\sqrt{\Omega}Q^Hs$ for convenience of expression.

$$\Gamma(t) = \sum_{k=1}^{N_T} \left| \tilde{y}_k - \sum_{j=k}^{N_T} \tilde{y}_{kj} \hat{t}_j \right|^2 \quad [\text{Eqn. 6}]$$

where $\hat{t}$ the infinite integer lattice.

Figure 4:
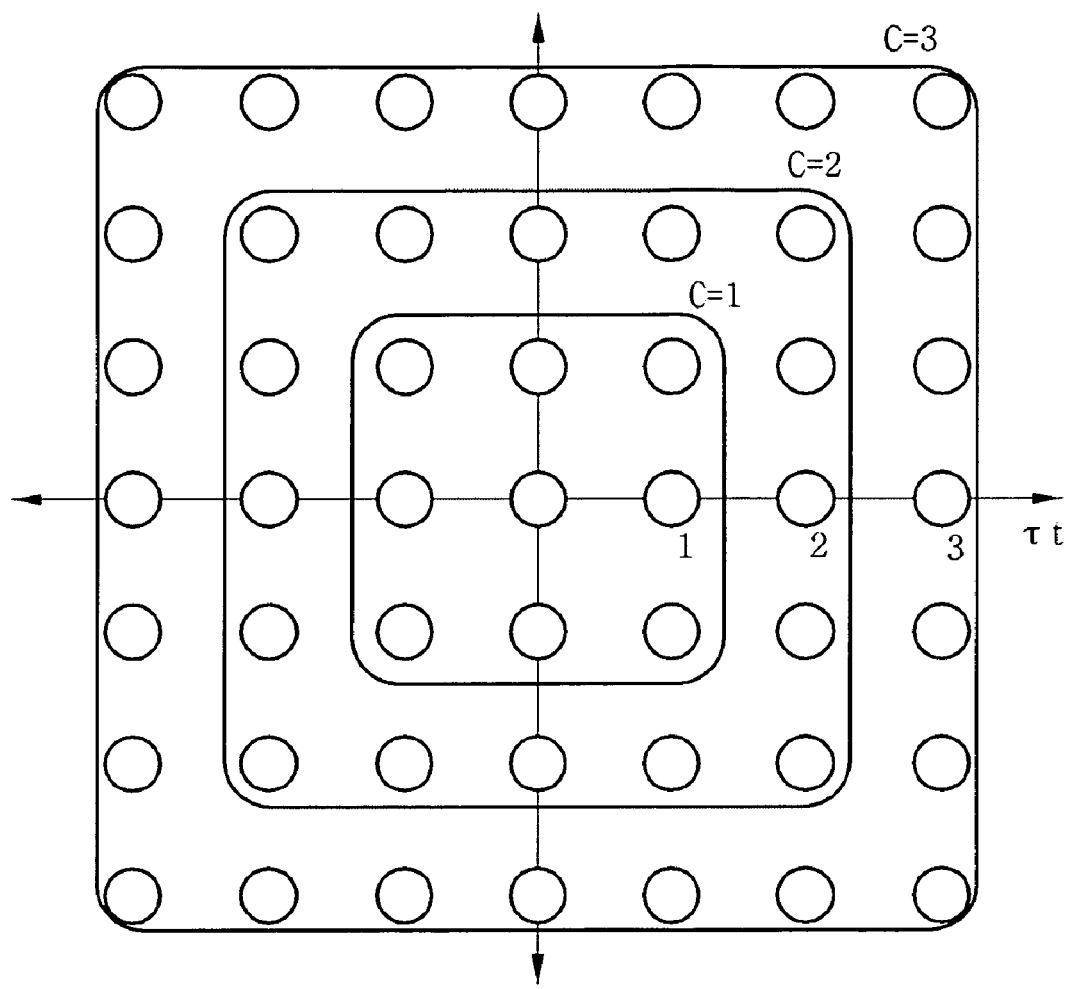
FIG. 4 illustrates a limitation to coverage of a candidate symbol in the iterative tree search-based precoding device for the multi-user multi-antenna communication illustrated in FIG. 3.

The branch metric of the candidate symbol generally has the integer lattice "$\hat{t}$". However, in this embodiment, the branch metric of the candidate symbol is limited to the integer lattice, i.e., the coverage of the candidate symbol, as illustrated in FIG. 4.

As described above, in order to limit the integer lattice, the coverage setup section 200 determines the coverage of the candidate symbol so as to be fitted to the channel state. Here, the coverage setup section 200 determines the coverage of the candidate symbol on the basis of the condition number of a channel satisfying Equation 7:

$$C_H = \frac{\lambda_{max}}{\lambda_{min}} \quad [\text{Eqn. 7}]$$

where $\lambda$ is the singular value of the channel matrix.

Figure 9:
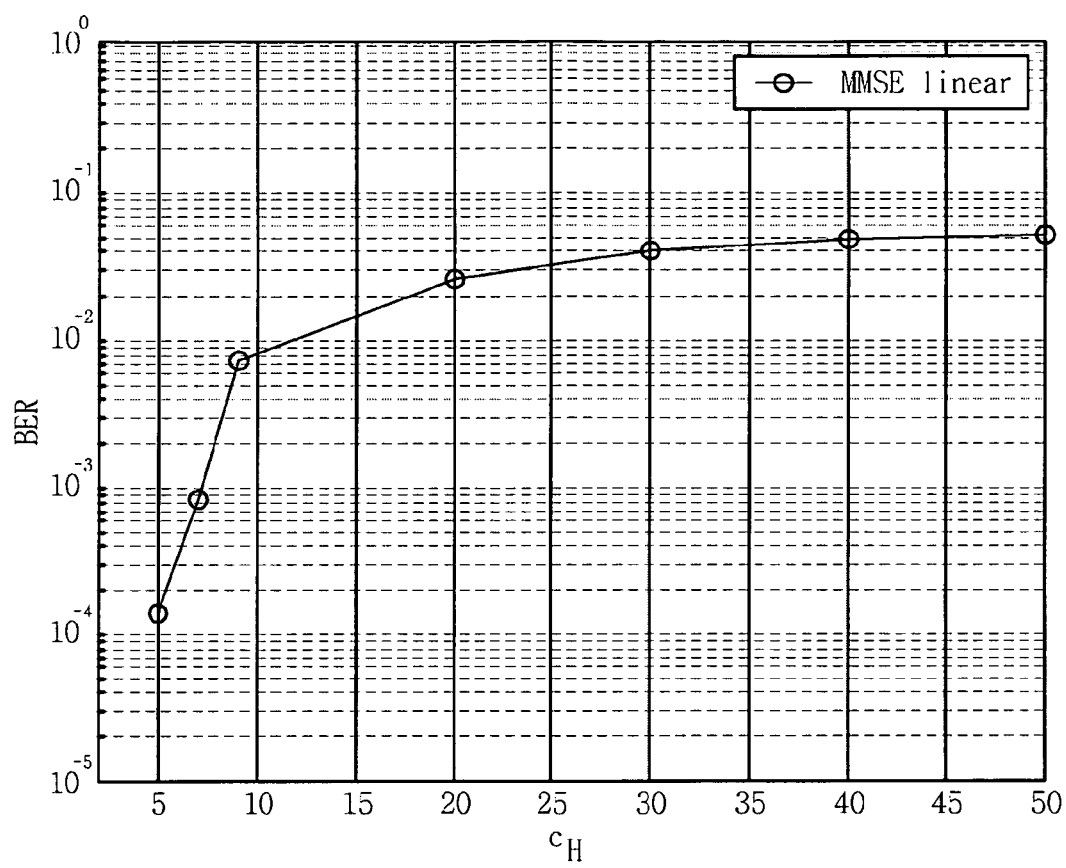
FIG. 9 illustrates BER performance according to the condition number of a channel in the iterative tree search-based preceding device and method for the multi-user multi-antenna communication system illustrated in FIG. 3 or 6.

For example, as illustrated in FIG. 9, when the condition number of the channel is low, BER performance is good, and that, when the condition number of the channel is high, BER performance is poor.

Figure 10:
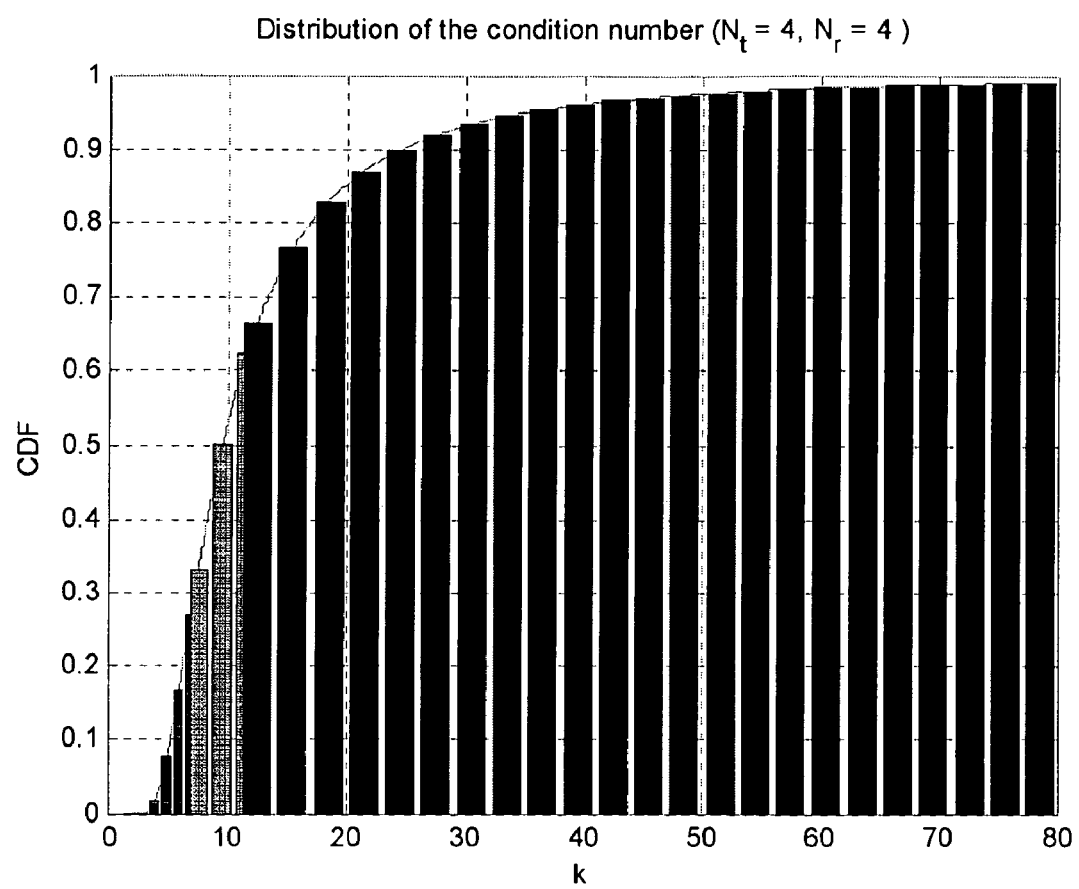
FIG. 10 illustrates a cumulative distribution function of the condition number of the channel in the iterative tree search-based preceding device and method for the multi-user multi-antenna communication system illustrated in FIG. 9.
Figure 11:
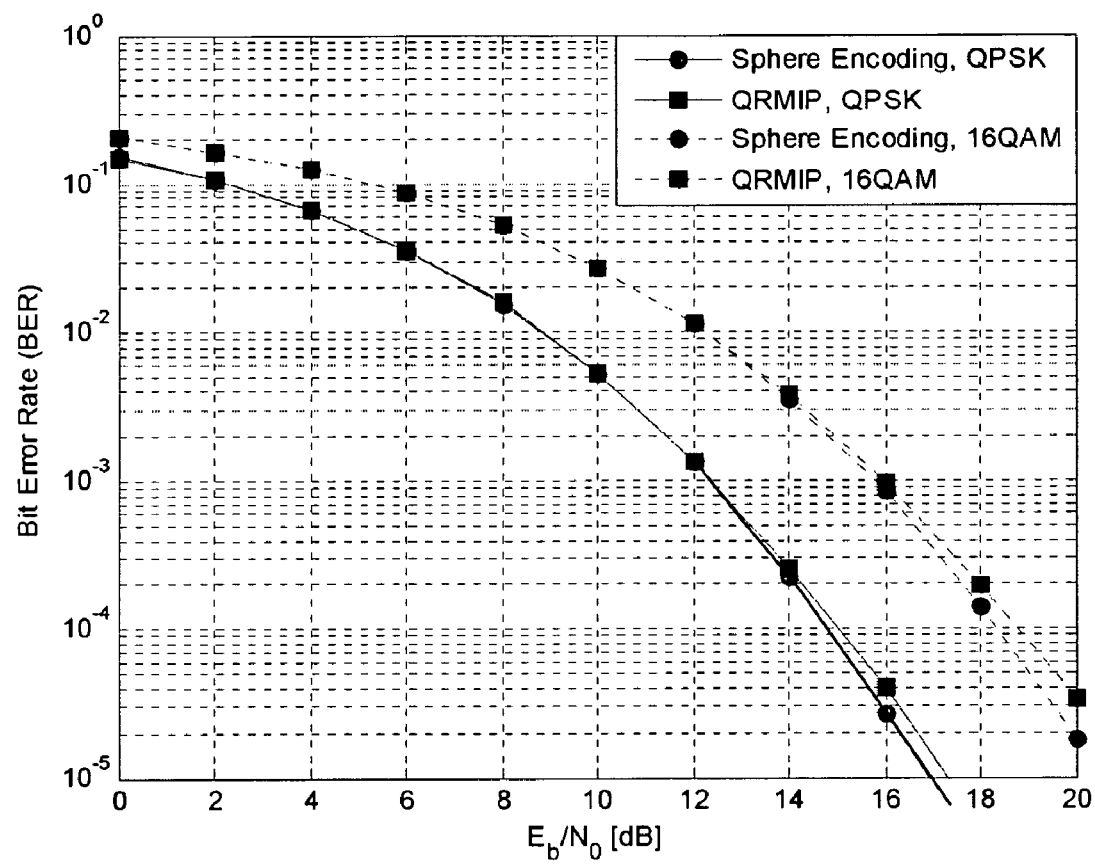
FIG. 11 illustrates BER performance among QRMIP, QPSK and 16QAM in the iterative tree search-based preceding device and method for the multi-user multi-antenna communication system illustrated in FIG. 3 or 6.
Figure 12:
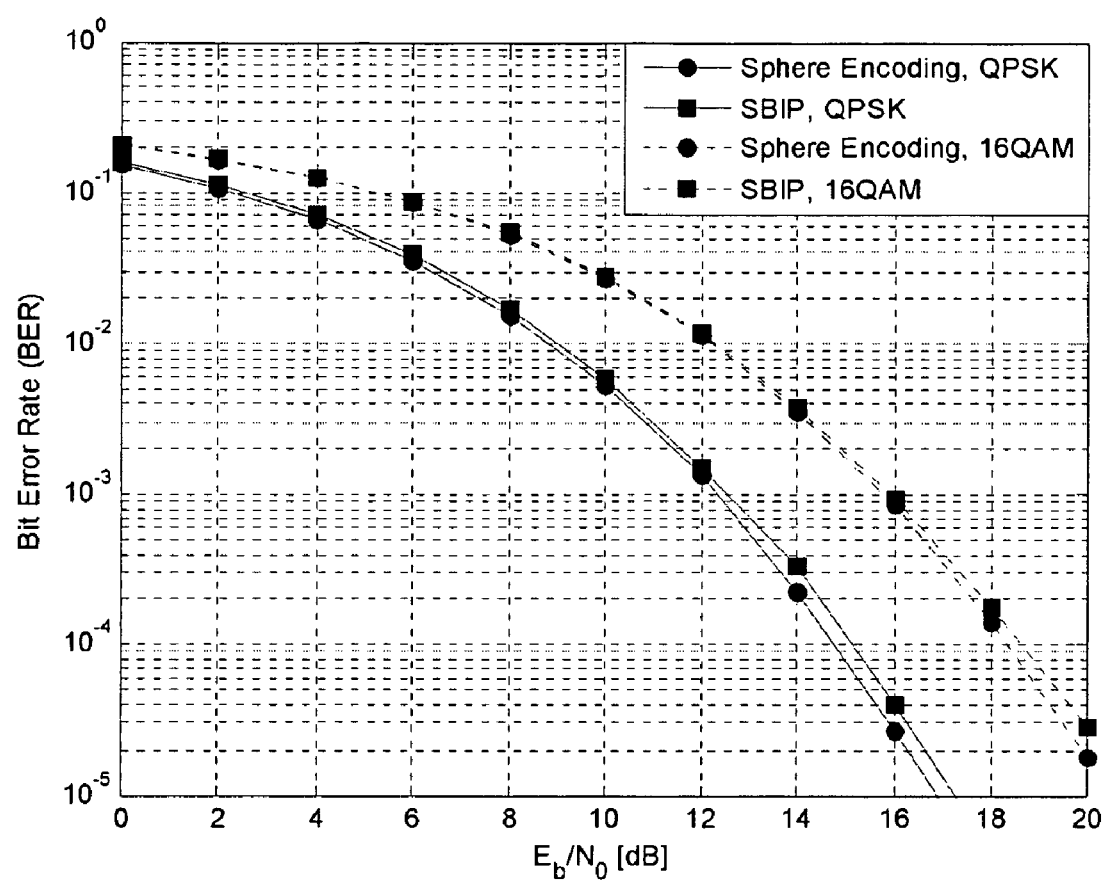
FIG. 12 illustrates BER performance among SBIP, QPSK and 16QAM in the iterative tree search-based preceding device and method for the multi-user multi-antenna communication system illustrated in FIG. 3 or 6.
Figure 13:
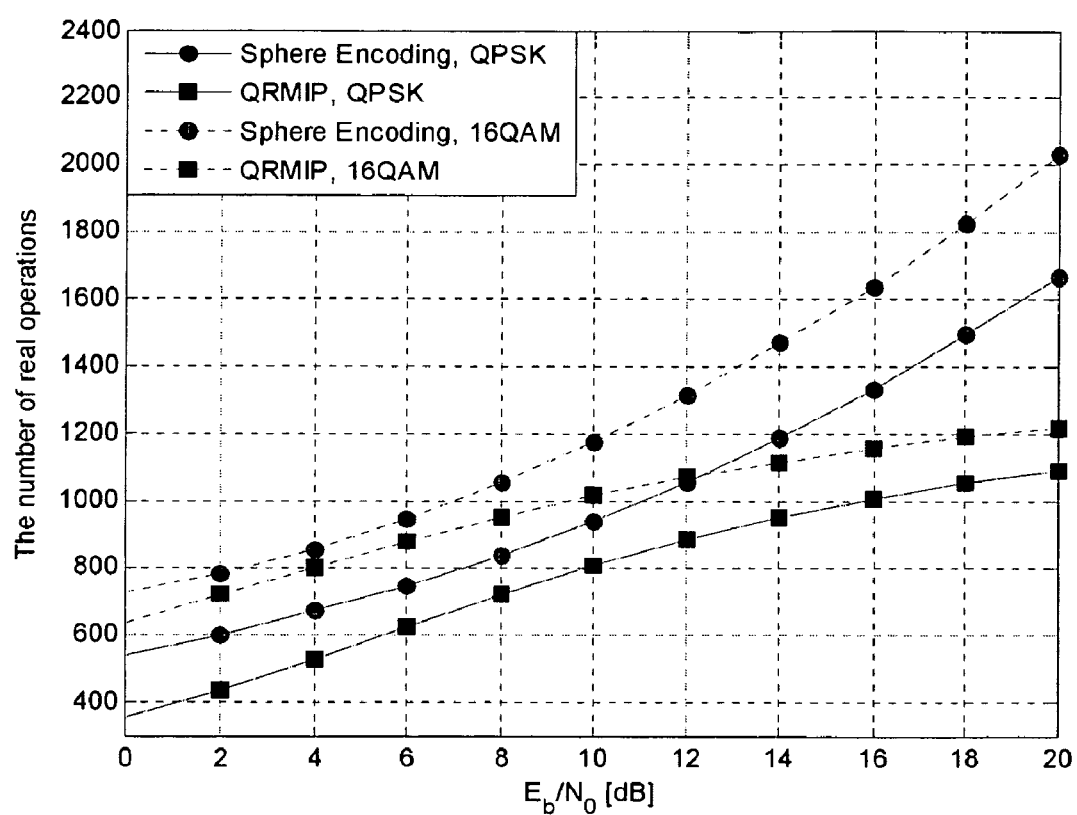
FIG. 13 illustrates complexity among QRMIP, QPSK and 16QAM in the iterative tree search-based preceding device and method for the multi-user multi-antenna communication system illustrated in FIG. 3 or 6.
Figure 14:
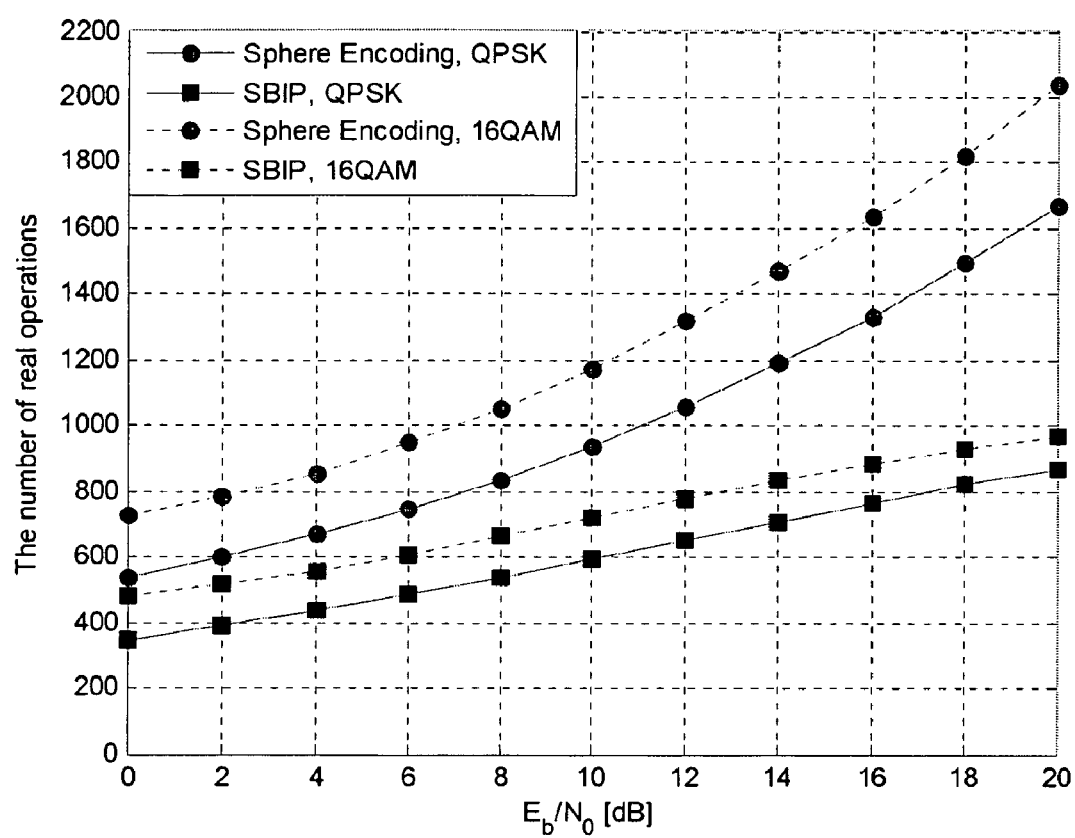
FIG. 14 illustrates complexity among SBIP, QPSK and 16QAM in the iterative tree search-based preceding device and method for the multi-user multi-antenna communication system illustrated in FIG. 3 or 6.

The coverage setup section 200 employs Cumulative Distribution Function (CDF) of the condition number of the channel in order to partition the coverage of the candidate symbol according to the channel state. The cumulative distribution function is expressed by Equation 8, and is as illustrated in FIG. 10.

$$Pr\left(\frac{C_H}{K} < x\right) = e^{-4/x^2} \quad [\text{Eqn. 8}]$$

In detail, the coverage setup section 200 determines the maximum coverage of the candidate symbol, selects one within a range from "1" to a value of the maximum coverage of the candidate symbol, and adjusts the coverage of the candidate symbol by equally partitioning the coverage of the candidate symbol using the maximum coverage of the candidate symbol in determining the coverage of the candidate symbol.

Further, the metric processing section 300 eliminates candidates having the cumulative branch metric values, which exceed a reference value of the cumulative branch metric of the determined candidate symbol, and registers candidate values of the cumulative branch metric, which do not exceed a reference value of the cumulative branch metric of the determined candidate symbol, as entries.

The metric processing section 300 determines whether or not the value of the cumulative branch metric of the candidate symbol is greater than the reference value of the cumulative branch metric of the symbol of a preset candidate when the candidate symbol is expanded first. As a result, when the value of the cumulative branch metric of an arbitrary candidate symbol is greater than the reference value of the cumulative branch metric of the symbol of the preset candidate, the metric processing section 300 eliminates a path connected to the next candidate symbol regardless of the next candidate. In contrast, when the value of the cumulative branch metric of an arbitrary candidate symbol is smaller than the reference value of the cumulative branch metric of the symbol of the preset candidate, the metric processing section 300 determines whether or not the next candidate symbol exists. When no next candidate symbol exists, the metric processing section 300 registers the value of the cumulative branch metric of the corresponding candidate symbol as an entry.

Further, when the next candidate symbol exists, the metric processing section 300 determines whether or not the next candidate symbol exceeds the coverage of the candidate symbol. As a result, when no next candidate symbol exceeds the coverage of the candidate symbol, the metric processing section 300 determines whether or not the value of the cumulative branch metric of the next candidate symbol is greater than the reference value of the cumulative branch metric of the symbol of the preset candidate. As a result, when the value of the cumulative branch metric of the next candidate symbol is greater than the reference value of the cumulative branch metric of the symbol of the preset candidate, the metric processing section 300 eliminates a path connected to the next candidate regardless of the next candidate.

When the next candidate symbol exceeds the coverage of the candidate symbol, the metric processing section 300 registers the value of the cumulative branch metric of the corresponding candidate symbol as an entry regardless of the next candidate.

Further, when the value of the cumulative branch metric of an arbitrary candidate symbol is smaller than the reference value of the cumulative branch metric of the symbol of the preset candidate, the metric processing section 300 determines whether or not the next candidate symbol exists. When the next candidate symbol exists, the metric processing section 300 proceeds to the process of determining whether or not the value of the cumulative branch metric of an arbitrary candidate symbol is greater than the reference value of the cumulative branch metric of the symbol of the preset candidate. In contrast, when no other next candidate symbol exists, the metric processing section 300 registers the value of the cumulative branch metric of the corresponding candidate symbol as an entry.

Then, the metric selecting section 400 selects the least value of the cumulative branch metric of the candidate symbol from the values of the cumulative branch metric of the candidate symbol which are registered as the entries.

General functions and detailed operations of the aforementioned components will not be described. Instead, the inventive operations will be described.

First, the description will be made in consideration of the multi-user multi-antenna downlink channel as illustrated in FIG. 1.

The signal "y" transmitted from the base station 1 to the multiple users that at the same time eliminate interference between the users in advance through the preceding device 10, are subjected to power normalization and transmitted to the user terminals 2.

This signal can be expressed by Equation 1 above and reproduced below.

$$y = Hx + n \quad \text{[Eqn. 1]}$$
$$= H\frac{Ps}{\sqrt{\gamma}} + n$$
$$(\gamma = \|Ps\|^2)$$

where H is the Rayleigh flat-fading channel matrix, n is the Gaussian noise vector, P is the preceding matrix for eliminating the interference between the users, s is the symbol vector of data to be transmitted, and γ is the normalized transmission power.

In this embodiment, the VP technique, which transforms a complex system into an integer system in order to search for an integer lattice, is used to add a distortion value to a modulated symbol so as to be able to minimize the normalization factor "γ."

Thus, in this embodiment, all the complex systems are transformed into the integer systems.

Afterwards, the distortion value "τt'" is added to an original signal so as to have a minimum normalization factor "γ", and this process is given by Equation 2 above and reproduced below:

$$t = \arg \min_{t' \in \mathcal{L}^{2K}} \gamma \quad \text{[Eqn. 2]}$$
$$= \arg \min_{t' \in \mathcal{L}^{2K}} \|Ps\|^2$$
$$= \arg \min_{t' \in \mathcal{L}^{2K}} \|P(s + \tau t')\|^2$$

where γ is the normalized transmission power, P is the preceding matrix for eliminating the interference between the users, s is the symbol vector of data to be transmitted, and τt' is the distortion value.

Meanwhile, the signal transmitted through this process can restore a value of original data through modulo operation by the same value "τ" at the user terminal 2, i.e., the receiving end.

However, the ZF-VP in which the precoding matrix "P" is expressed into the inverse matrix of the channel matrix "H" is subjected to reduction in SINR of the user terminal 2, i.e., the receiving end that is responsible for the degradation of performance.

Thus, the SINR of the receiving end can be increased by applying the MMSE-VP technique considering noise and interference as in Equation 3 above and reproduced below:

$$P = H^H(HH^H + \alpha I)^{-1} \quad \text{[Eqn. 3]}$$

According to Optimum MMSE-VP technology, the channel response is divided into an eigenvalue and an eigenvector through SVD, and it is possible to search for the vector "t" that can minimize noise and interference power and maximize the SINR of the receiving end using these eigenvalues.

The total MSE rather than the transmission power is minimized. Finally, the cost function is given by Equation 4 above and reproduced below:

$$t = \arg \min_{t' \in \mathcal{L}^{2K}} \left\| \sqrt{\Omega} \, Q^H(s + \tau t') \right\|^2 \quad \text{[Eqn. 4]}$$
$$\Omega = \frac{K\sigma^2 I}{\Lambda + K\sigma^2 I}$$

where Λ denotes the channel matrix, H denotes the diagonal matrix with the eigenvalues, Q denotes the matrix with the eigenvectors according to the eigenvalues. These matrices can be obtained through SVD (i.e. $HH^H = Q\Lambda Q^H$).

It is important to determine the distortion value "τt'" so as to have MMSE. This determines an optimum value of the vector "t" through SE so as to detect the maximum approximation lattice point in the integer lattice space.

Meanwhile, the metric processing section 300 performs the QR decomposition on the vector "t", which can maximize the SINR of the receiving end and is expressed by Equation 4 by dividing the channel response into the eigenvalue and vector through SVD, and minimizing noise and interference power and using these eigenvalues, in order to form the tree structure, to limit the coverage of the candidate symbol, and to represent the type used in the receiving end for smooth operation of the algorithm, and its result is given by Equation 5 as above and reproduced below:

$$\hat{t} = \arg \min_{t' \in \mathcal{L}^{2K}} \left\| \tilde{y} - \tilde{R}\tilde{t}' \right\|^2 \quad \text{[Eqn. 5]}$$
$$\tilde{y} = \tilde{Q}^H \sqrt{\Omega} \, Q^H s, -\tau\sqrt{\Omega} \, Q^H = \tilde{Q}\tilde{R}$$

The branch metric of the candidate symbol satisfying Equation 5 can be expressed by Equation 6 below. In Equation 5, the QR decomposition is performed on $-\tau\sqrt{\Omega}Q^H$ in order to make the form of a triangular matrix for a smooth tree search, and thus $\tilde{Q}\tilde{R}$ is obtained. Both sides are multiplied by $\tilde{Q}^H$, which is a unitary matrix, so that the remaining portions can be expressed by $\tilde{Q}^H\sqrt{\Omega}Q^H s - \tilde{R}\tilde{t}'$, which is briefly expressed by $\tilde{y} = \tilde{Q}^H\sqrt{\Omega}Q^H s$ for convenience of expression.

$$\Gamma(t) = \sum_{k=1}^{N_T} \left| \tilde{y}_k - \sum_{j=k}^{N_T} \tilde{y}_{kj} \hat{t}_j \right|^2 \quad \text{[Eqn. 6]}$$

where $\hat{t}$ the infinite integer lattice.

In setting the reference value of the branch metric of this candidate symbol, as illustrated in FIG. 1, when the complex system is transformed into the integer system in the system where the number of transmitting antennas is $N_T$, and the user having one receiving antenna is K, the size increases twice. In consideration of this condition, the algorithm based on tree search is as follows.

In detail, the reference value setup section 100 sets the value of a cumulative metric of a full-length sequence where a total length is $N_T$ (equal to the number of the transmitting antennas) to the reference value, $\Gamma_{ref}=\|\sqrt{\Omega}Q^H s\|^2$ of the cumulative branch metric of this candidate symbol.

Meanwhile, since the user terminal 2, the receiving end, has no reference, the algorithm starts by setting the reference value to infinity ($\Gamma_{ref}=\infty$). However, since the base station 1, the transmitting end, adds the distortion value in order to set a value becoming smaller than $\|\sqrt{\Omega}Q^H s\|^2$, the base station can set an initial reference. Thus, it is not necessary to expand a node greater than $\|\sqrt{\Omega}Q^H s\|^2$ at a first depth using this initial reference.

Further, the metric processing section 300 has the infinite integer lattice with respect to the integer latter "t" of the branch metric of the candidate symbol. This infinite integer lattice is limited through the coverage setup section 200.

Continuously, the coverage setup section 200 determines the coverage of the candidate symbol on the basis of the condition number of the channel satisfying Equation 7:

$$C_H = \frac{\lambda_{max}}{\lambda_{min}} \qquad [\text{Eqn. 7}]$$

where $\lambda$ is the singular value of the channel matrix.

In other words, since the base station has a possibility of performing an unnecessary search, the base station searches for the channel according to the channel state. For example, the base station searches for the channel having small candidates with respect to the channel having a good state, whereas base station searches for the channel having many candidates with respect to the channel having a bad state.

Further, the coverage setup section 200 employs the CDF of the condition number of the channel in order to partition the coverage of the candidate symbol according to the channel state. The CDF is expressed by Equation 8 as follows:

$$Pr\left(\frac{C_H}{K} < x\right) = e^{-4/x^2} \qquad [\text{Eqn. 8}]$$

The coverage setup section 200 employs a method of partitioning the coverage of the candidate symbol with the same ratio in order to find a critical value on the basis of the CDF given by Equation 8.

For example, in the case of the system meeting $N_T=4$, and K=4, when the maximum coverage of the candidate symbol is limited to 3, the coverage can be partitioned into three equal parts, and the resulting critical values are 33% and 66% respectively, and are set to $Pr(C_H \leq 7.63)=0.33$ and $Pr(C_H \leq 12.55)=0.66$. Thus, in order to perform the search, when the condition number of the current channel is smaller than 7.63, the coverage of the candidate symbol is set to "1." When the condition number of the current channel is greater than 12.55, the coverage of the candidate symbol is set to "3."

Accordingly, as described above, the reference value of the cumulative branch metric of the candidate symbol and the maximum coverage of the candidate symbol are set through the reference value setup section 100 and the coverage setup section 200, and then the metric processing section 300 determines whether or not the value of the cumulative branch metric of the candidate symbol is greater than the reference value of the cumulative branch metric of the symbol of the preset candidate when the candidate symbol is expanded first. In other words, Early Termination Technique (ETT) for improving the complexity is used to perform the tree searching process.

Figure 5A:
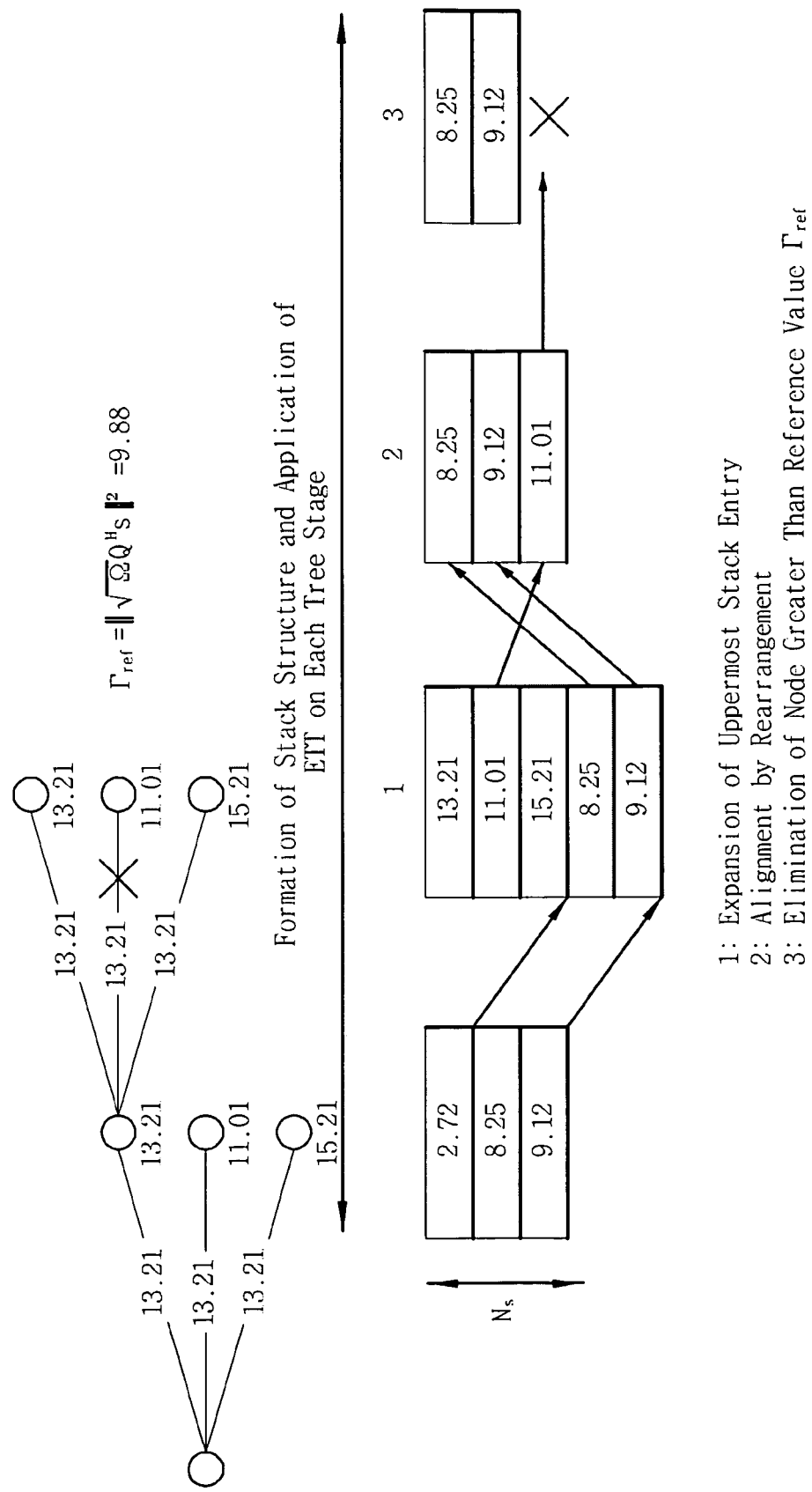
FIG. 5A illustrates application of SBIP to an iterative tree search-based precoding device for a multi-user multi-antenna communication system according to an exemplary embodiment of the present invention.

With reference to FIGS. 5A and 5B, a description will be given by applying SBIP and QRMIP.

As shown in FIG. 5A, when the SBIP is applied, the values of the cumulative branch metric 2.27, 8.25, and 9.12 are provided to respective stacks by node expansion.

When the value of the cumulative branch metric of the arbitrary candidate symbol is greater than a reference value of a cumulative branch metric of a preset candidate symbol, the metric processing section 300 prunes or eliminates a path connected to a next candidate irrespective whether or not the next candidate is present.

In contrast, when the value of the cumulative branch metric of the arbitrary candidate symbol is smaller than a reference value of a cumulative branch metric of a preset candidate symbol, the metric processing section 300 determines whether or not a symbol of the next candidate is present. Specifically, it is determined whether or not the next candidate is present when a first node has the values of the cumulative branch metric 2.72, 8.25, and 9.12, which are smaller than the cumulative branch metric reference value 9.88 of the candidate symbol.

When the symbol of the next candidate is not present, the metric processing section 300 registers the value of the cumulative branch metric of the candidate symbol as an entry. That is, when the next candidate is not present, a node having the values of the cumulative branch metric 8.25 and 9.25 is registered as an entry.

Conversely, when the symbol of the next candidate is present, the metric processing section 300 determines whether or not the symbol of the next candidate exceeds the coverage of the candidate symbol 3.

When the symbol of the next candidate 2 does not exceed the coverage of the candidate symbol, the metric processing section 300 determines whether or not the value of the cumulative branch metric of the next candidate symbol is greater than the reference value of value of the cumulative branch metric of the preset candidate symbol. In the case where the next candidate is present, a node having a metric value 2.72 is not registered as an entry, and the process is expanded to the next candidate.

Here, when the value of the cumulative branch metric of the next candidate is greater than the reference value of the cumulative branch metric of the preset candidate symbol, the metric processing section 300 eliminates a path connected to the next candidate irrespective whether or not the next candidate is present.

The values of the cumulative branch metric of the next candidate symbol can be acquired by adding the value of the cumulative branch metric 2.72 of the first node with the values of the cumulative branch metric 10.49, 8.29, and 12.49 of the second node.

The values of the cumulative branch metric of the second node symbol are then determined to be 13.21, 10.01, and 15.21, which are greater than the reference value of the cumulative branch metric of the preset candidate symbol. Therefore, the corresponding node is eliminated.

When the value of the cumulative branch metric of the next candidate symbol exceeds the coverage of the candidate symbol, the metric processing section 300 registers the value of the cumulative branch metric of the corresponding candidate symbol as an entry irrespective whether or not the next candidate is present. In the case of registration, the value of the cumulative branch metric of the corresponding candidate symbol is required to be smaller than the reference value of the cumulative branch metric of the candidate symbol.

Conversely, when the value of the cumulative branch metric of the next candidate symbol is smaller than the reference value of the cumulative branch metric of the preset candidate symbol, the metric processing section 300 determines whether or not the next candidate symbol is present.

When the next candidate symbol is present, the metric processing section 300 proceeds to the process of determining whether or not the value of the cumulative branch metric of an arbitrary candidate symbol is greater than the reference value of the cumulative branch metric of the symbol of the preset candidate.

When the next candidate symbol is not present, the metric processing section 300 registers the values of the cumulative branch metric of the corresponding symbol as entries.

Thus, the values of the cumulative branch metric of the candidate symbol registered as entries are 8.25 and 9.12.

Thereafter, the metric selecting section 400 selects smallest one 8.25 of the values of the cumulative branch metric of the candidate symbol registered as entries.

As shown in FIG. 5B, the ORMIP stores the values of the cumulative branch metric 2.27, 4.22, and 8.82 in stacks, respectively, by node expansion, and includes nodes that can be expanded.

First expansion is carried out on candidate symbols, which are arranged in the order, as shown in FIG. 5B.

Then, as shown in FIG. 2, a full-length sequence $[\tilde{t}_{N_T,1}, \ldots \tilde{t}_{1,1}]^T$ subsequent to one candidate symbol $\tilde{t}_{N_T,1}$ of the candidate symbols, which has the smallest metric, is searched.

The first full-length sequence searched as above can be assumed to have a cumulative branch metric $\Gamma_1$. When the cumulative branch metric $\Gamma_1$ is smaller than the initially-determined value $\Gamma_{ref}$, update is executed. The initially-determined value $\Gamma_{ref}$ is a reference value for determining whether or not to repeat the process.

By comparing this value with the branch metric value $b_{N_T,2}$ of the second candidate symbol, it is determined to repeat a second time or terminate the process in an early stage. When $\Gamma_1 < b_{N_T,2}$, the process of detecting signals terminates. Otherwise, a full-length sequence subsequent to the second candidate symbol is searched by a tree search algorithm.

This is because it is impossible to exclude a probability that the full-length sequence found in the second repetition might have a value of the cumulative branch metric smaller than that of the full-length sequence found in the first branch.

In the case of $\Gamma_1 < b_{N_T,2}$, the second repeating process is carried out. The value of the cumulative branch metric of any searched symbol string may be greater than $\Gamma_{ref}$ even when it is not of a full length.

In this case, an extended search algorithm of the corresponding node is terminated as shown in FIG. 2 since a further search process is meaningless.

Figure 6:
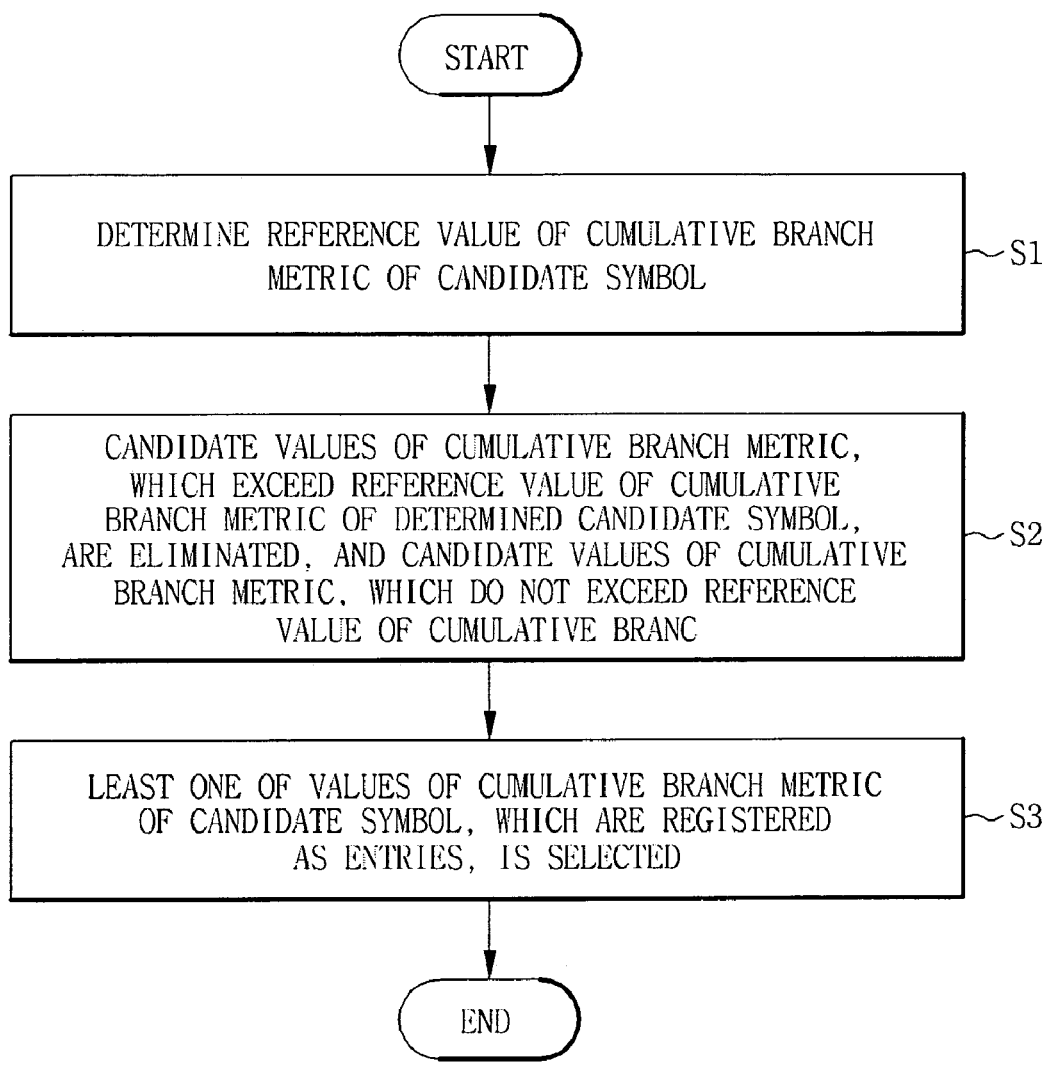
FIG. 6 illustrates a flowchart for an iterative tree search-based precoding method for a multi-user multi-antenna communication system according to an exemplary embodiment of the present invention.
Figure 7:
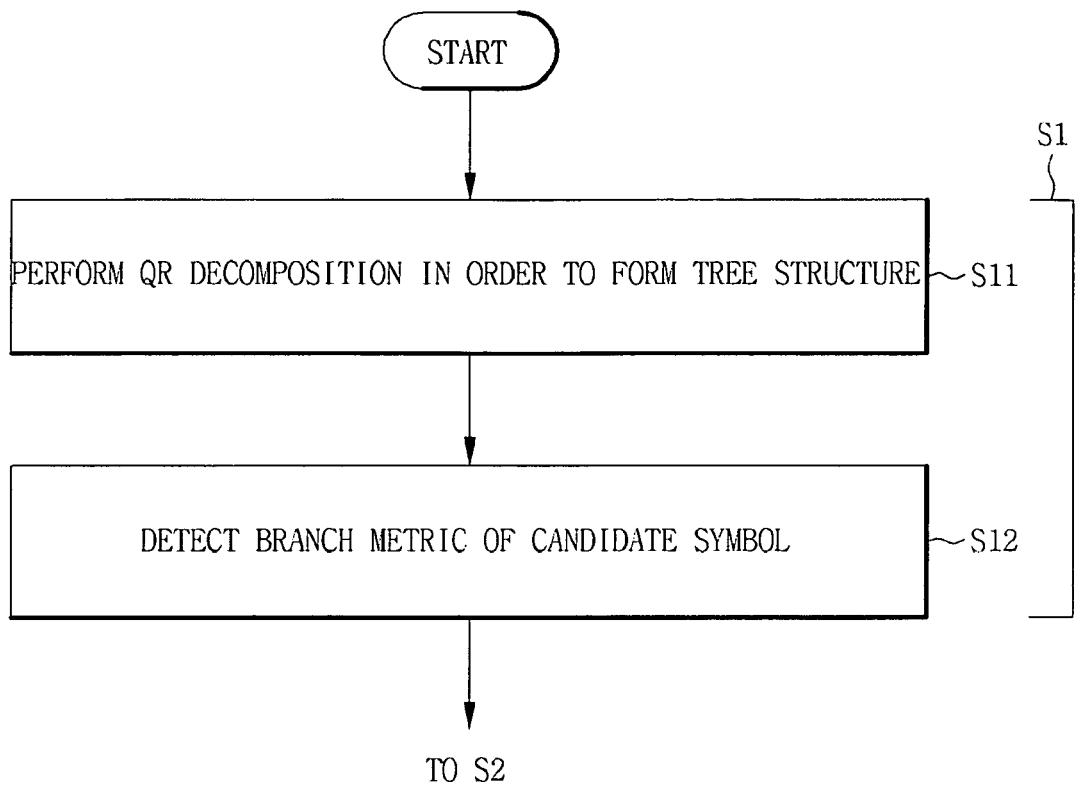
FIG. 7 illustrates a flowchart for the detailed configuration of a process of determining a reference value of a cumulative branch metric in the iterative tree search-based preceding method for the multi-user multi-antenna communication system illustrated in FIG. 6.

Below, with reference to FIG. 6, a description will be given of an iterative tree search-based preceding method in the multi-user multi-antenna communication system of the invention having the above-described configuration.

First, a reference value of a cumulative branch metric of a candidate symbol is determined (in step S1). Below, with reference to FIG. 7, a detailed description will be given of the step S1 of determining a reference value of a cumulative branch metric of a candidate symbol.

Equation 4 representing vector t is formed in a tree structure, wherein vector t can divide a channel response into unique value and vector through conventional Singular Value Decomposition (SVD), and then minimize noise and interference power as well as maximizing reception SINR using the divided values, and the metric processing section 300 performs QR decomposition in order to transform Equation 4 expressing the vector "t" into a tree structure, to limit coverage of the candidate symbol, and to represent a type used in the receiving end for smooth operation of the algorithm (in step S11). The result is given by Equation 5 below:

$$\hat{t} = \arg \min_{t' \in \mathcal{Q}^{2K}} \|\tilde{y} - \tilde{R}t'\|^2 \quad \text{[Eqn. 5]}$$

$$\tilde{y} = \tilde{Q}^H \sqrt{\Omega} Q^H s, -\tau\sqrt{\Omega} Q^H = \tilde{Q}\tilde{R}$$

The branch metric of the candidate symbol satisfying Equation 5 above is expressed as in Equation 6 below (S12). In Equation 5, the QR decomposition is performed on $-\tau\sqrt{\Omega}Q^H$ in order to make the form of a triangular matrix for a smooth tree search, and thus $\tilde{Q}\tilde{R}$ is obtained. Then, both sides are multiplied by $\tilde{Q}^H$, which is a unitary matrix, so that the remaining portions can be expressed by $\tilde{Q}^H\sqrt{\Omega}Q^H s - \tilde{R}t'$, which is briefly expressed by $\tilde{y} = \tilde{Q}^H\sqrt{\Omega}Q^H s$ for convenience of expression.

$$\Gamma(t) = \sum_{k=1}^{N_T} \left| \tilde{y}_{kj} - \sum_{j=k}^{N_T} \tilde{y}_{kj}\hat{t}_j \right|^2 \quad \text{[Eqn. 6]}$$

where $\hat{t}$ is the infinite integer lattice.

In order to determine the coverage of the candidate symbol so as to be fitted to the channel condition, the coverage of the candidate symbol is determined on the basis of the condition number of a channel satisfying Equation 7:

$$C_H = \frac{\lambda_{max}}{\lambda_{min}} \quad \text{[Eqn. 7]}$$

where $\lambda$ is a singular value of a channel matrix.

The Cumulative Distribution Function (CDF) of the condition number of the channel for partitioning the coverage of the candidate symbol according to the channel condition is expressed by Equation 8:

$$Pr\left(\frac{C_H}{K} < x\right) = e^{-4/x^2} \quad \text{[Eqn. 8]}$$

Accordingly, the step of determining the coverage of the candidate symbol so as to be fitted to the channel condition determines the maximum coverage of the candidate symbol, and selects one within a range from "1" to a value of the maximum coverage of the candidate symbol.

The coverage of the candidate symbol is adjusted by equally portioning it using the maximum coverage of the candidate symbol.

Subsequently, candidate values of the cumulative branch metric, which exceed a reference value of the cumulative branch metric of the determined candidate symbol, are eliminated and candidate values of the cumulative branch metric, which do not exceed a reference value of the cumulative branch metric of the determined candidate symbol, are registered as entries (in step S2).

Below, with reference to FIGS. 8A and 8B, a description will be given of the step S2 of eliminating candidate values of the cumulative branch metric, which exceed a reference value of the cumulative branch metric of the determined candidate symbol, and registering candidate values of the cumulative branch metric, which do not exceed a reference value of the cumulative branch metric of the determined candidate symbol, as entries.

Figure 8B:
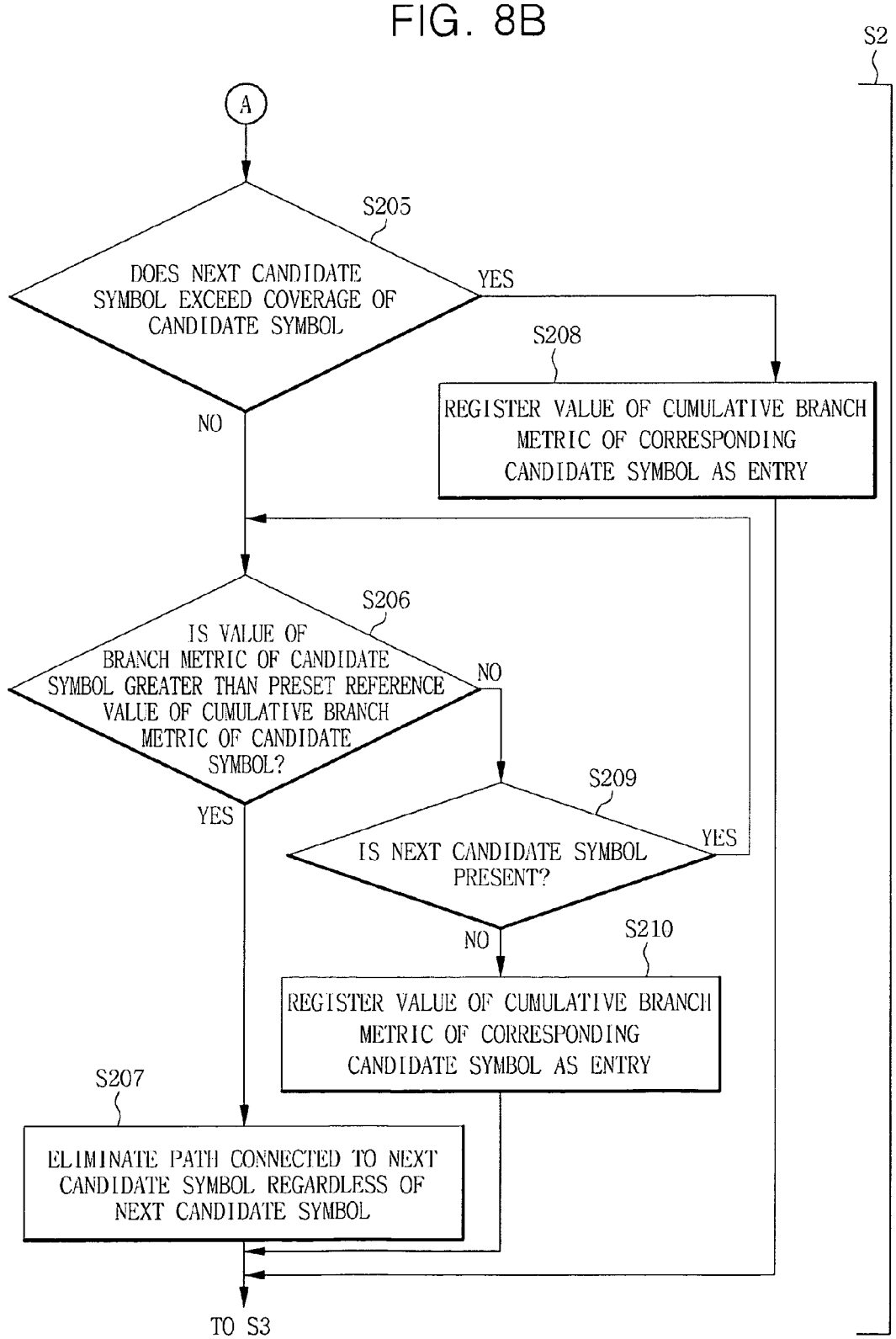

FIGS. 8A and 8B are flowcharts illustrating a process of eliminating metrics exceeding a reference value in the low-complexity precoding method based on vector perturbation in the multi-user multi-antenna communication system.

Firstly, it is determined whether or not a value of a cumulative branch metric of an arbitrary candidate symbol is greater than the reference value of the cumulative branch metric of the preset candidate symbol when the candidate symbol is expanded first (in step S201).

As a result of the step S201 of determining whether or not a value of a cumulative branch metric of an arbitrary candidate symbol is greater than the reference value of the cumulative branch metric of the preset candidate symbol, when the value of the cumulative branch metric of the arbitrary candidate symbol is greater than the reference value of the cumulative branch metric of the preset candidate symbol (e.g., YES), a path connected to the next candidate is eliminated regardless whether or not the next candidate symbol is present (in step S202).

In contrast, as a result of the step S201 of determining whether or not a value of a cumulative branch metric of an arbitrary candidate symbol is greater than the reference value of the cumulative branch metric of the preset candidate symbol, when the value of the cumulative branch metric of the arbitrary candidate symbol is not greater than the reference value of the cumulative branch metric of the preset candidate symbol (e.g., NO), it is determined whether or not the next candidate symbol is present (in step S203).

As a result of the step S203 of determining whether or not the next candidate symbol is present, when the next candidate symbol is not present (e.g., NO), the value of the cumulative branch metric of the corresponding symbol is registered as an entry (S204).

In contrast, as a result of the step S203 of determining whether or not the next candidate symbol is present, when the next candidate symbol is present (e.g., YES), it is determined whether or not the next candidate symbol exceeds the coverage of the candidate symbol (S205).

As a result of the step S205 of determining whether or not the next candidate symbol exceeds the coverage of the candidate symbol, when the next candidate symbol does not exceed the coverage of the candidate symbol (e.g., NO), it is determined whether or not the value of the cumulative branch metric of the next candidate symbol is greater than the reference value of the cumulative branch metric of the preset candidate symbol (S206).

As a result of the step S206 of determining whether or not the value of the cumulative branch metric of the next candidate symbol is greater than the reference value of the cumulative branch metric of the preset candidate symbol, when the value of the cumulative branch metric of the next candidate symbol is greater than the reference value of the cumulative branch metric of the preset candidate symbol (YES), a path connected to the next candidate is eliminated regardless whether or not the next candidate symbol is present (S207).

In contrast, as a result of the step S205 of determining whether or not the next candidate symbol exceeds the coverage of the candidate symbol, when the next candidate symbol exceeds the coverage of the candidate symbol (e.g., YES), the value of the cumulative branch metric of the corresponding candidate symbol is registered as an entry regardless whether or not the next candidate symbol is present (in step S208).

Conversely, a result of the step S206 of determining whether or not the value of the cumulative branch metric of the next candidate symbol is greater than the reference value of the cumulative branch metric of the preset candidate symbol, when the value of the cumulative branch metric of the next candidate symbol is greater than the reference value of the cumulative branch metric of the preset candidate symbol (e.g., NO), it is determined whether or not the next candidate symbol is present (in step S209).

As a result of the step S209 of determining whether or not the next candidate symbol is present, when the next candidate symbol is present (e.g., YES), the process returns to the step S206 of determining whether or not the value of the cumulative branch metric of the next candidate symbol is greater than the reference value of the cumulative branch metric of the preset candidate symbol. Conversely, when the next candidate symbol is not present (e.g., NO), the value of the cumulative branch metric of the corresponding candidate symbol is registered as an entry (in step S210).

Next, least one of the values of the cumulative branch metric of the candidate symbol, which are registered as entries, is selected (in step S3).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An iterative tree search-based precoding method for a multi-user Multi-Input Multi-Output (MIMO) communication system, the iterative tree search-based precoding method comprising:
    transmitting, by a base station, a pilot signal to at least one receipt terminal, previously eliminating interference with respect to a signal to be transmitted to the receipt terminal using information about a channel state provided from the receipt terminal, and performing power normalization on the signal; and
    transmitting, by the base station, the signal, which is distorted by a distortion value to be used for modulo operation at the receipt terminal, to the receipt terminal, wherein transmitting the signal to the receipt terminal comprises:
    determining a reference value of a cumulative branch metric of a candidate symbol;
    eliminating candidates having values that exceed the determined reference value of the cumulative branch metric of the candidate symbol, and
    registering values, which do not exceed the determined reference value of the cumulative branch metric of the candidate symbol, as entries.

2. The iterative tree search-based precoding method of claim 1, wherein transmitting the signal to the receipt terminal further comprises:
    selecting a lowest value from the values registered as the entries.

3. The iterative tree search-based precoding method of claim 2, wherein, in the determining of the reference value of the cumulative branch metric of the candidate symbol, the reference value of the cumulative branch metric of the candidate symbol is smaller than a square $\|\tilde{y}\|^2$ of the transmitted signal.

4. The iterative tree search-based precoding method of claim 2, wherein the eliminating of the candidates and the registering of the values as the entries includes:
    performing QR decomposition on a vector "t", which can maximize a received Signal to Interference and Noise Ratio (SINR) and expressed by a first equation, in order to form a tree structure as well as limit a coverage of the candidate symbol, deriving second equation from the first equation; and expressing the branch metric of the candidate symbol satisfying the second equation into a third equation, and wherein the fist equation is:

$$t = \arg\min_{t' \in \mathbb{C}^{2K}} \left\| \sqrt{\Omega}\, Q^H(s + \tau t') \right\|^2$$

$$\Omega = \frac{K\sigma^2 I}{\Lambda + K\sigma^2 I};$$

the second equation is:

$$\hat{t} = \arg\min_{t' \in \mathbb{C}^{2K}} \left\| \tilde{y} - \tilde{R}\tilde{t}' \right\|^2$$

$$\tilde{y} = \tilde{Q}^H \sqrt{\Omega}\, Q^H s, -\tau \sqrt{\Omega}\, Q^H = \tilde{Q}\tilde{R}; \text{ and}$$

the third equation is:

$$\Gamma(t) = \sum_{k=1}^{N_T} \left| \tilde{y}_k - \sum_{j=k}^{N_T} \tilde{y}_{kj} \hat{t}_j \right|^2, \text{ and}$$

where $\hat{t}$ denotes the infinite integer lattice.

5. The iterative tree search-based precoding method of claim 4, further comprising limiting the coverage of the candidate symbol fitted to a state of the channel.

6. The iterative tree search-based precoding method of claim 5, wherein the integer lattice "$\hat{t}$" of the branch metric of the candidate symbol which represents the coverage of the candidate symbol selects one within a range from "1" to a value of the maximum coverage of the candidate symbol on a basis of a condition number of the channel satisfying a fourth equation, and limits the coverage of the candidate symbol and wherein the fourth equation is:

$$C_H = \frac{\lambda_{max}}{\lambda_{min}}$$

where $\lambda$ denotes the singular value of a channel matrix.

7. The iterative tree search-based precoding method of claim 6, wherein the condition number of the channel is expressed by a cumulative distribution function for partitioning according to the channel state, the cumulative distribution function equally partitioning the maximum coverage of the candidate symbol through a fifth equation, and wherein the fifth equation is:

$$\Pr\left(\frac{C_H}{K} < x\right) = e^{-4/x^2}.$$

8. The iterative tree search-based precoding method of claim 4, wherein the eliminating of the candidates and the registering of the values as the entries includes:
determining whether the value of the cumulative branch metric of an arbitrary candidate symbol is greater than a preset reference value of the cumulative branch metric of the candidate symbol when the candidate symbol is expanded first; and
when the value of the cumulative branch metric of an arbitrary candidate symbol is greater than a preset reference value of the cumulative branch metric of the candidate symbol, eliminating a path connected to a next candidate regardless of the next candidate.

9. The iterative tree search-based precoding method of claim 8, further comprising:
when the value of the cumulative branch metric of an arbitrary candidate symbol is not greater than a preset reference value of the cumulative branch metric of the candidate symbol, determining whether the symbol of the next candidate exists; and
when the symbol of the next candidate does not exist, registering the value of the cumulative branch metric of the symbol of the corresponding candidate as an entry.

10. The iterative tree search-based precoding method of claim 9, further comprising:
when the symbol of the next candidate exists, determining whether the symbol of the next candidate exceeds the coverage of the candidate symbol;
when the symbol of the next candidate does not exceed the coverage of the candidate symbol, determining whether the value of the cumulative branch metric of the symbol of the next candidate is greater than the reference value of the cumulative branch metric of the symbol of a preset candidate; and
when the value of the cumulative branch metric of the symbol of the next candidate is greater than the reference value of the cumulative branch metric of the symbol of a preset candidate, eliminating a path connected to the next candidate regardless of the next candidate.

11. The iterative tree search-based precoding method of claim 10, further comprising:
when the symbol of the next candidate exceeds the coverage of the candidate symbol, registering the value of the cumulative branch metric of the symbol of the corresponding candidate as an entry regardless of the next candidate.

12. The iterative tree search-based precoding method of claim 10, further comprising:
when the value of the cumulative branch metric of the symbol of the next candidate is not greater than the reference value of the cumulative branch metric of the symbol of a preset candidate, determining whether the symbol of the next candidate exists; and
when the symbol of the next candidate exists, proceeding to the determining of whether the value of the cumulative branch metric of the symbol of the next candidate is not greater than the reference value of the cumulative branch metric of the symbol of a preset candidate, and when the symbol of the next candidate does not exist, registering the value of the cumulative branch metric of the symbol of the corresponding candidate as an entry.

13. An iterative tree search-based precoding apparatus for a base station in a multi-user Multi-Input Multi-Output (MIMO) communication system, the iterative tree search-based precoding device comprising:
a transmitter configured to transmit a pilot signal to a receipt terminal, previously eliminating interference with respect to a signal to be transmitted to the receipt terminal using information about a channel state provided from the receipt terminal;
a precoding device configured to perform power normalization on the signal;
a reference value setup section configured to determine a reference value of a cumulative branch metric of a candidate symbol; and
a metric processing section configured to eliminate candidates having values that exceed the determined reference value of the cumulative branch metric of the candidate symbol, and register values, which do not exceed the determined reference value of the cumulative branch metric of the candidate symbol, as entries, wherein the transmitter is configured to transmit the signal, which is distorted by a distortion value to be used for modulo operation at the receipt terminal, to the receipt terminal.

14. The iterative tree search-based precoding apparatus of claim 13 further comprising:
a metric selecting section configured to select the least value from the values registered as the entries.

15. The iterative tree search-based precoding apparatus of claim 14, wherein the reference value setup section is configured to set a value smaller than a square $\|\tilde{y}\|^2$ of the transmitted signal as the reference value of the cumulative branch metric of the candidate symbol.

16. The iterative tree search-based precoding apparatus of claim 15, wherein the metric processing section is configured to perform QR decomposition on a vector "t", which can maximize a received Signal to Interference and Noise Ratio (SINR) and is expressed by a first equation, in order to form a tree structure as well as limit a coverage of the candidate symbol, deriving a second equation from the first equation, and expresses the branch metric of the candidate symbol satisfying the second equation into a third equation, and wherein the fist equation is:

$$t = \arg \min_{t' \in \mathcal{L}^{2K}} \left\| \sqrt{\Omega} \, Q^H (s + \tau t') \right\|^2$$

$$\Omega = \frac{K\sigma^2 I}{\Lambda + K\sigma^2 I};$$

the second equation is:

$$\hat{t} = \arg \min_{t' \in \mathcal{L}^{2K}} \left\| \tilde{y} - \tilde{R} t' \right\|^2$$

$$\tilde{y} = \tilde{Q}^H \sqrt{\Omega} \, Q^H s, \ -\tau \sqrt{\Omega} \, Q^H = \tilde{Q}\tilde{R};$$

and the third equation is:

$$\Gamma(t) = \sum_{k=1}^{N_T} \left| \tilde{y}_k - \sum_{j=k}^{N_T} \tilde{y}_{kj} \hat{t}_j \right|^2$$

where $\tilde{t}$ denotes the infinite integer lattice.

17. The iterative tree search-based precoding apparatus of claim 16, further comprising a coverage setup section configured to limit the coverage of the candidate symbol fitted to a state of the channel.

18. The iterative tree search-based precoding apparatus of claim 17, wherein the coverage setup section has the infinite integer lattice with respect to the integer lattice "t" of the branch metric of the candidate symbol which represents the coverage of the candidate symbol selects one within a range from "1" to a value of the maximum coverage of the candidate symbol on a basis of a condition number of the channel satisfying a fourth equation, and limits the coverage of the candidate symbol, and wherein the fourth equation is:

$$C_H = \frac{\lambda_{max}}{\lambda_{min}}$$

where $\lambda$ denotes the singular value of a channel matrix.

19. The iterative tree search-based precoding apparatus of claim 18, wherein the condition number of the channel is expressed by a cumulative distribution function for partitioning according to the channel state, the cumulative distribution function equally partitioning the maximum coverage of the candidate symbol through a fifth equation, and wherein the fifth equation is:

$$Pr\left(\frac{C_H}{K} < x\right) = e^{-4/x^2}.$$

20. The iterative tree search-based precoding apparatus of claim 16, wherein the metric processing section is configured to determine whether the value of the cumulative branch metric of an arbitrary candidate symbol is greater than a preset reference value of the cumulative branch metric of the candidate symbol when the candidate symbol is expanded first, and eliminates a path connected to a next candidate regardless of the next candidate when the value of the cumulative branch metric of an arbitrary candidate symbol is greater than a preset reference value of the cumulative branch metric of the candidate symbol.

21. The iterative tree search-based precoding apparatus of claim 20, wherein the metric processing section is configured to determine whether the symbol of the next candidate exists when the value of the cumulative branch metric of an arbitrary candidate symbol is not greater than a preset reference value of the cumulative branch metric of the candidate symbol, and registers the value of the cumulative branch metric of the symbol of the corresponding candidate as an entry when the symbol of the next candidate does not exist.

22. The iterative tree search-based precoding apparatus of claim 21, the metric processing section is configured to determine whether the symbol of the next candidate exceeds the coverage of the candidate symbol when the symbol of the next candidate exists, determines whether or not the value of the cumulative branch metric of the symbol of the next candidate is greater than the reference value of the cumulative branch metric of the symbol of a preset candidate when the symbol of the next candidate does not exceed the coverage of the candidate symbol, and eliminates a path connected to the next candidate regardless of the next candidate when the value of the cumulative branch metric of the symbol of the next candidate is greater than the reference value of the cumulative branch metric of the symbol of a preset candidate.

23. The iterative tree search-based precoding apparatus of claim 22, wherein the metric processing section is configured to register the value of the cumulative branch metric of the symbol of the corresponding candidate as an entry regardless of the next candidate when the symbol of the next candidate exceeds the coverage of the candidate symbol.

24. The iterative tree search-based precoding apparatus of claim 23, wherein the metric processing section is configured to determine whether the symbol of the next candidate exists when the value of the cumulative branch metric of the symbol of the next candidate is not greater than the reference value of the cumulative branch metric of the symbol of a preset candidate, proceed to determine whether the value of the cumulative branch metric of the symbol of the next candidate is not greater than the reference value of the cumulative branch metric of the symbol of a preset candidate when the symbol of the next candidate exists, and register the value of the cumulative branch metric of the symbol of the corresponding candidate as an entry when the symbol of the next candidate does not exist.

* * * * *